US008958569B2

(12) United States Patent
Bar-Zeev et al.

(10) Patent No.: US 8,958,569 B2
(45) Date of Patent: Feb. 17, 2015

(54) SELECTIVE SPATIAL AUDIO COMMUNICATION

(75) Inventors: Avi Bar-Zeev, Redmond, WA (US); Elad Gerson, Seattle, WA (US); Kenn Cartier, Redmond, WA (US); Eyal Ofek, Redmond, WA (US); Gur Kimchi, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 339 days.

(21) Appl. No.: 13/329,220

(22) Filed: Dec. 17, 2011

(65) Prior Publication Data

US 2013/0156220 A1    Jun. 20, 2013

(51) Int. Cl.
*H04R 3/00* (2006.01)

(52) U.S. Cl.
USPC .............................. 381/92; 381/91; 381/122

(58) Field of Classification Search
USPC ........................................ 381/92, 91, 122, 56
See application file for complete search history.

(56) References Cited

U.S. PATENT DOCUMENTS

| | | | |
|---|---|---|---|
| 5,633,993 | A | 5/1997 | Redmann et al. |
| 6,093,880 | A | 7/2000 | Arnalds |
| 6,199,045 | B1 | 3/2001 | Giniger et al. |
| 6,301,845 | B1 | 10/2001 | Milanian |
| 6,446,040 | B1 | 9/2002 | Socher et al. |
| 6,496,776 | B1 | 12/2002 | Blumberg et al. |
| 7,173,619 | B2 | 2/2007 | Hill et al. |
| 7,266,207 | B2 | 9/2007 | Wilcock et al. |
| 7,333,618 | B2 | 2/2008 | Shuttleworth et al. |
| 7,844,215 | B2 | 11/2010 | Vance et al. |

(Continued)

FOREIGN PATENT DOCUMENTS

| | | |
|---|---|---|
| EP | 1954019 A1 | 8/2008 |
| WO | WO 01/35600 A2 | 5/2001 |

(Continued)

OTHER PUBLICATIONS

Sawhney, Nitin, "Contextual Awareness, Messaging and Communication in Nomadic Audio Environments", Retrieved Jun. 9, 2011 at <<http://web.media.mit.edu/~nitin/msthesis/nomadic_thesis98.pdf>>, Massachusetts Institute of Technology. Dept. Of Architecture. Program in Media Arts and Sciences, Jun. 1998, pp. 1-122.

(Continued)

*Primary Examiner* — Paul S Kim
(74) *Attorney, Agent, or Firm* — Steven Spellman; Jim Ross; Micky Minhas

(57) ABSTRACT

Audio data associated with a plurality of originating sources is obtained, the audio data directed to a participant entity. An originating entity associated with one of the originating sources is determined. A listener focus indication is obtained from the participant entity indicating a listener focus on the originating entity. A spatial positional relationship is determined between the participant and originating entities. A filtering operation is initiated to enhance a portion of the audio data associated with the originating entity, the portion enhanced relative to another portion of the audio data that is associated with the originating sources other than the first one. A spatialization of a stream of the first portion that is based on a participant positional listening perspective is initiated, based on the spatial positional relationship. Transmission of a spatial stream of audio data is initiated to the participant entity, based on the filtering operation and spatialization.

20 Claims, 12 Drawing Sheets

(56) References Cited

U.S. PATENT DOCUMENTS

| | | | |
|---|---|---|---|
| 2003/0228023 A1* | 12/2003 | Burnett et al. | 381/92 |
| 2005/0143915 A1 | 6/2005 | Odagawa et al. | |
| 2006/0104458 A1 | 5/2006 | Kenoyer et al. | |
| 2006/0119572 A1 | 6/2006 | Lanier | |
| 2006/0126877 A1 | 6/2006 | Porschmann | |
| 2007/0161382 A1 | 7/2007 | Melinger et al. | |
| 2007/0174042 A1 | 7/2007 | Thompson | |
| 2008/0109317 A1 | 5/2008 | Singh | |
| 2008/0260131 A1 | 10/2008 | Akesson | |
| 2009/0116652 A1 | 5/2009 | Kirkeby et al. | |
| 2009/0240540 A1 | 9/2009 | Smith | |
| 2010/0316232 A1 | 12/2010 | Acero et al. | |
| 2011/0231767 A1 | 9/2011 | Russell et al. | |
| 2012/0331093 A1 | 12/2012 | Cartier et al. | |

FOREIGN PATENT DOCUMENTS

| | | |
|---|---|---|
| WO | WO/2013/003101 | 1/2013 |
| WO | WO/2013/090216 A1 | 6/2013 |

OTHER PUBLICATIONS

Mariette, et al., "Sounddelta—Large Scale, Multi-User Audio Augmented Reality", Retrieved Jun. 9, 2011 at <<http://auralization.tkk.fi/sites/default/openfiles/SymposiumProceedings/papers/mariette_eaa09.pdf>>, The EAA Symposium on Auralization, Jun. 15-17, 2009, pp. 1-6.

Jin, et al., "Real-time, Head-tracked 3D Audio with Unlimited Simultaneous Sounds", Retrieved Jun. 9, 2011 at <<http://dev.icad.org/Proceedings/2005/JinTan2005.pdf>>, Proceedings of the Eleventh Meeting of the International Conference on Auditory Display (ICAD), Jul. 6-9, 2005, pp. 308-311.

Sundareswaran, et al., "3D Audio Augmented Reality: Implementation and Experiments", Retrieved Jun. 9, 2011 at <<http://ieeexplore.ieee.org/stamp/stamp.jsp?tp=&arnumber=1240728&userType=inst>>, Proceedings of the 2nd IEEE/ACM International Symposium on Mixed and Augmented Reality (ISMAR), Oct. 7-10, 2003, pp. 296-297.

Aoki, et al., "The Mad Hatter's Cocktail Party: A Social Mobile Audio Space Supporting Multiple Simultaneous Conversations", Retrieved Jun. 9, 2011 at http://citeseerx.ist.psu.edu/viewdoc/download?doi=10.1.1.15.7925&rep=rep1&type=pdf>>, The SIGCHI conference on Human factors in computing systems (CHI), Apr. 5-10, 2003, pp. 425-432.

"The vOICe for Android", Retrieved at <<http://www.seeingwithsound.com/android.htm>>, Retrieved Date: Jun. 10, 2011, 8 Pages.

Cartier, K., et al., U.S. Appl. No. 13/169,021, entitled "Audio Presentation of Condensed Spatial Contextual Information", filed Jun. 27, 2011, 54 pages.

"International Search Report", Mailed Date: Mar. 4, 2013, Application No. PCT/US2012/068841, Filed Date: Dec. 11, 2012, 3 pages.

"International Search Report", Mailed Date: Nov. 30, 2012, Application No. PCT/US2012/043031, Filed Date: Jun. 18, 2012, pp. 10.

Scherp, et al., "MM4U—A Framework for Creating Personalized Multimedia Content", Retrieved Mar. 15, 2011 at <<http://ansgarscherp.net/publications/2005d-ScherpBoll-MM4U.pdf>>, 2003, 59 Pages.

Roy, et al., "Wearable Audio Computing: A Survey of Interaction Techniques", Retrieved Mar. 15, 2011 at <<http://www.google.co.in/url?sa=t&source=web&cd=2&ved=0CB0QFjAB&url=http%3A%2F%2Fweb.media.mit.edu%2F~nitin%2FNomadicRadio%2FAudioWearables.ps.gz&ei=dj1_TY7QAsLd4Aas1qW-Ca&usg=AFQjCNFUVfVTKxQYODRoW8HQoPUIBeZOw>>, 1997, 9 Pages.

"Text-to-Speech and the Microsoft Speech Technologies Platform", Retrieved Mar. 16, 2011 at <<http://msdn.microsoft.com/en-us/library/ms994644.aspx>>, Jul. 2003, 5 Pages.

"Sennheiser GuidePORT System", Retrieved Mar. 16, 2011 at <<http://www.guideport.com/sennheiser/guideport_eng.nsf/root/selfguided-walking-tours.html>>, 2 Pages.

Office Action mailed on Aug. 15, 2013 for U.S. Appl. No. 13/169,021, inventors Cartier, K., et al., entitled "Audio Presentation of Condensed Spatial Contextual Information", filed Jun. 27, 2011, 13 pages.

Response filed Feb. 11, 2014, to Office Action mailed on Aug. 15, 2013 for U.S. Appl. No. 13/169,021, inventors Cartier, K., et al., entitled "Audio Presentation of Condensed Spatial Contextual Information", filed Jun. 27, 2011, 20 pages.

Office Action mailed on Apr. 29, 2014 for U.S. Appl. No. 13/169,021, inventors Cartier, K., et al., entitled "Audio Presentation of Condensed Spatial Contextual Information", filed Jun. 27, 2011, 14 pages.

\* cited by examiner

SELECTIVE SPATIAL AUDIO COMMUNICATION

BACKGROUND

Users of electronic devices are increasingly expecting more flexibility in their abilities to communicate with others. For example, mobile phone use may involve entering a phone number, activating a "dial" feature, and waiting for a listener to answer to begin a conversation. As mobile device technologies have advanced, many users may use cameras on their respective devices to conduct conversations with device video providing each participant with a video stream of the other participant as a conversation progresses. If either participant (or both participants) is in a group of people speaking, the sounds and images of all participants in the group may be transmitted to the respective listener(s) on the other end of the conversation. It may also be possible to include another participant (or participant group) via three-way calling (e.g., dialing a second phone number and waiting for the third participant to answer). As another example, conference calling may be used to include several participants via dial-in by each participant. If multiple participants start speaking at the same time, it may be difficult for listeners to ascertain who is speaking, and what is being said.

SUMMARY

According to one general aspect, a system may include an audio data acquisition component that obtains a first set of audio data associated with a plurality of originating sources, the first set of audio data directed to a first participant entity. The system may also include an audio source determination component that determines a first originating entity associated with a first one of the plurality of originating sources. The system may also include a focus determination component that obtains, via a device processor, a first listener focus indication from the first participant entity indicating a first listener focus on the first originating entity. The system may also include a spatial relationship component that determines a spatial positional relationship between the first participant entity and the first originating entity. The system may also include an audio enhancement component that initiates a first filtering operation on the first set of audio data to enhance a first portion of the first set audio data that is associated with the first originating entity, the first portion enhanced relative to another portion of the first set of audio data that is associated with the plurality of originating sources other than the first one of the plurality of originating sources. The system may also include a spatialization component that initiates a spatialization of a stream of the first portion that is based on a first participant positional listening perspective, based on the spatial positional relationship between the first participant entity and the first originating entity. The system may also include a spatial audio transmission component that initiates transmission of a spatial stream of audio data to the first participant entity, based on the first filtering operation and the spatialization.

According to another aspect, a computer program product tangibly embodied on a computer-readable storage medium may include executable code that may cause at least one data processing apparatus to obtain, from a first participant entity, a first participant focus indication indicating a first focus of the first participant entity on a second participant entity. Further, the at least one data processing apparatus may obtain, via a device processor, a first portion of a set of audio data associated with the first participant entity as a first originating source, the first portion directed to the second participant entity, based on the first participant focus indication. Further, the at least one data processing apparatus may determine a spatial positional relationship between the first participant entity and the second participant entity. Further, the at least one data processing apparatus may obtain, via the device processor, a second portion of the set of audio data associated with a third participant entity as a second originating source, the second portion directed to the second participant entity. Further, the at least one data processing apparatus may initiate a first filtering operation on the set of audio data to enhance the first portion, the first portion enhanced relative to another portion of the set of audio data that is associated with one or more originating sources other than the first originating source, the another portion including the second portion. Further, the at least one data processing apparatus may initiate a spatialization of the first portion that is based on a second participant positional listening perspective, based on the spatial positional relationship between the first participant entity and the second participant entity. Further, the at least one data processing apparatus may initiate transmission of a first spatial stream of audio data to the second participant entity, based on the first filtering operation and the spatialization.

According to another aspect, a first participant focus indication indicating a first focus of the first participant entity on a second participant entity may be obtained, from a first participant entity. A first portion of a set of audio data associated with the first participant entity as a first originating source may be obtained, via a device processor, the first portion directed to the second participant entity, based on the first participant focus indication. A first spatial positional relationship between the first participant entity and the second participant entity may be determined. A second participant focus indication indicating a second focus of the first participant entity on a third participant entity may be obtained, from the first participant entity. A second portion of the set of audio data associated with the first participant entity as the first originating source may be obtained, the second portion directed to the third participant entity. A first filtering operation may be initiated on the set of audio data to enhance the first portion, the first portion enhanced relative to a first other portion of the set of audio data that is associated with originating sources including at least one originating source other than the first originating source, the first other portion including the second portion. A first spatialization of the first portion that is based on a second participant positional listening perspective may be initiated, based on the spatial positional relationship between the first participant entity and the second participant entity. Transmission of a first spatial stream of audio data to the second participant entity may be initiated, based on the first filtering operation and the spatialization. A second filtering operation may be initiated on the set of audio data to enhance the second portion, the second portion enhanced relative to a second other portion of the set of audio data that is associated with originating sources including at least one originating source other than the first originating source, the second other portion including the first portion. A second spatialization of the second portion that is based on a third participant positional listening perspective may be initiated, based on the spatial positional relationship between the first participant entity and the third participant entity. Transmission of a second spatial stream of audio data to the third participant entity may be initiated, based on the second filtering operation and the second spatialization.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DRAWINGS

DETAILED DESCRIPTION

Figure 1A:
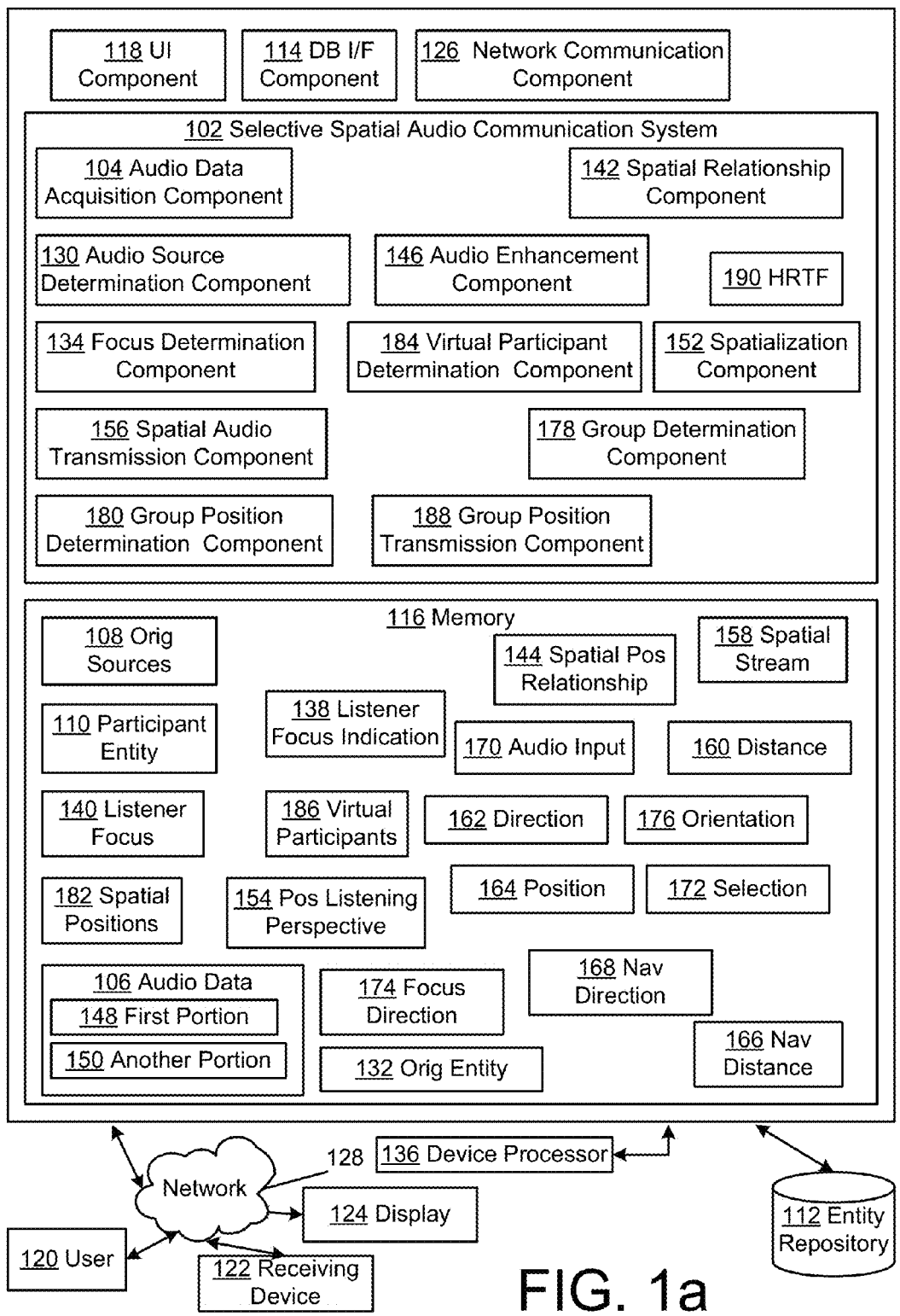
FIG. 1 is a block diagram of an example system for selective spatial audio communication.

Many conversations may occur in rooms or localized spaces wherein the participants may be able to physically view each other participant, and further may be able to sense locations of the other participants based on hearing their voices (or other sounds) physically emanating from particular respective three-dimensional (3-D) directions, relative to a 3-D position of the respective listener. For example, if a first participant is looking forward, and a second participant directly behind him/her speaks over the left shoulder of the first participant, then the first participant may sense the position of the second participant, based on audio signals received in the ears of the first participant, and processed by the first participant's brain to indicate that the second participant is directly behind him/her.

For example, the first participant may then rotate his/her head and/or body to face in the direction of the second participant to conduct a focused discussion with the second participant. As the first participant rotates his/her head and/or body, the directional perspective of the first participant and second participant may change dynamically, as the ears of the first participant receive sounds from the second participant in dynamically different perspectives, with the rotational movement. For example, the listener perspective may dynamically change from "over the left shoulder" to slightly to the left, in front" of the first participant, as the ears of the first participant are positioned in correspondence with movements of the first participant's head/body toward the second participant. For example, such dynamic movement of the first participant may signal a desire of the first participant to speak to the second participant in a more focused manner.

According to example embodiments discussed herein, users of electronic devices may send and receive spatial audio data. The spatial audio data may be transmitted to listeners with information indicating a listener perspective of the listener with respect to a position associated with the originating sender source of the spatial audio data, so that the listener(s) may perceive that the spatial audio data is emanating from the originating sender, positioned at the position associated with the originating sender source of the spatial audio data, relative to the respective listener. For example, if Joe Smith is associated with a position that is five feet directly behind a position associated with Ann Smith, then spatial audio data originating from Joe Smith may be received by Ann Smith with a perspective indicating that Joe Smith is five feet directly behind the listener, Ann Smith. Similarly, if Tim Smith is also included in the conversation, but is seated in a room next door, then the spatial audio from Joe Smith may be received by Tim Smith with a perspective indicating that Joe Smith is in the next room from the listener, Tim Smith. For example, the spatial audio data received by Tim may indicate a navigational perspective, so that Tim may navigate various direction (e.g., around walls, up/down stairs) to arrive at the position associated with Joe Smith. For example, the spatial audio data may provide a perspective of distance, in various directions, so that Tim may navigate in the perceived direction of the spatial audio to arrive at Joe's associated location.

According to example embodiments discussed herein, users of electronic devices may send and receive spatial audio data, based on one or more selections of participants in conversations. Positional relationships among the participants may be determined, and the spatial audio data may be filtered and enhanced to provide listener perspectives that spatial audio data received by respective listeners is emanating from locations associated with respective originating senders of the spatial audio data.

According to example embodiments discussed herein, the selections of participants in conversations may be based on 3-D audio input and/or haptic feedback received from respective participants (e.g., listeners and/or senders). For example, a first participant may modify an orientation of the first participant's head in a direction moving toward a position associated with a second entity to indicate a selection of the second entity as a second participant. For example, the first participant may speak a name or label associated with the second entity to indicate a selection of the second entity as a second participant. For example, a first participant may activate an icon (e.g., via a menu or a displayed diagram) to indicate a selection of the second entity as a second participant.

According to example embodiments discussed herein, audio data may be "spatialized" to include information that provides participant positional listening perspectives with regard to spatial positional relationships between/among the participant entities. For example, a spatialization of a stream of audio data may be accomplished via use of head related transfer functions, as discussed further herein. For example, a spatialization of a stream of audio data may include determining binaural formatted audio data based on the spatial positional relationships between/among the participant entities.

In this context, a "binaural" format refers to a formatting of audio data that provides perceptions to a listener of sounds emanating from various directions relative to the listener, or from various locations relative to the listener. According to an example embodiment, the formatting may be based on techniques for imitating audio perceptions of sounds entering a left or right ear of a listener, the perceptions based on sounds emanating from a distance or nearby, or from an angle relative to the listener (e.g., above, behind, below, ahead of, or to the right or left of the user). For example, a sound may be substantially muted when imitating a sound emanating from a large distance relative to the listener, or a sound describing an entity located a distance far from the listener. According to an example embodiment, the formatting may be based on modulation techniques associated with audio data.

According to example embodiments discussed herein, filtering and enhancing the spatial audio data may include determining filtered and enhanced spatial audio data that may provide a "group conversation" perspective to respective listeners, based on enhancing a portion of the spatial audio associated with the selected participant with greater clarity (for the selecting listener) than another portion of the spatial audio that is associated with other participants. Further, spatial audio data received from multiple participants may be mixed to provide a "group conversation" effect with regard to desired participants. Thus, the selecting listener may perceive a "cocktail party effect" of multiple participants in a conversation. For example, the multiple participants may be physically located in a common room, or may be physically located in different respective geographic localities.

According to example embodiments discussed herein, the positional relationships among the participants may be determined based on actual physical locations or on other locations associated with respective participants.

According to example embodiments discussed herein, virtual participants may be selected by one or more other participants. For example, the virtual participants may be located in different physical localities from the other participants, or the virtual participants may be associated with virtualized, computerized entities (e.g., the computerized entity "WATSON" of INTERNATIONAL BUSINESS MACHINES (IBM)). For example, the virtual participants may be associated with audio data recorded previously and stored for transmission or for listening as a spatial audio stream at a time of request by another participant. For example, the audio data recorded previously may be stored on a server, or on a user device associated with the requesting participant.

Thus, spatial audio conversations may be initiated simply and fluidly, based on gestures/movements/audio inputs of respective participants to identify other desired participants in the conversations.

As further discussed herein, FIG. 1 is a block diagram of a system 100 for providing selective spatial audio communications. As shown in FIG. 1, a system 100 may include a selective spatial audio communication system 102 that includes an audio data acquisition component 104 that may obtain a first set of audio data 106 associated with a plurality of originating sources 108, the first set of audio data 106 directed to a first participant entity 110. For example, the first set of audio data 106 may include conversations between/among the plurality of originating sources 108, and directed (at least) to the first participant entity 110.

For example, the audio data may include audio signals associated with a human utterance of a phrase that may include one or more words. For example, the audio data may include audio signals associated with a human utterance of letters of an alphabet (e.g., a human spelling one or more words). For example, the audio data may include audio features data resulting from processing of audio signals associated with an utterance, for example, processing from an analog signal to a numeric digital form, which may also be compressed for storage, or for more lightweight transmission over a network. For example, the audio data may include audio signals resulting from a plurality of speakers and/or other sounds. For example, the audio data may include audio signals associated with one or more conversations.

According to an example embodiment, the selective spatial audio communication system 102 may include executable instructions that may be stored on a computer-readable storage medium, as discussed below. According to an example embodiment, the computer-readable storage medium may include any number of storage devices, and any number of storage media types, including distributed devices.

For example, an entity repository 112 may include one or more databases, and may be accessed via a database interface component 114. One skilled in the art of data processing will appreciate that there are many techniques for storing repository information discussed herein, such as various types of database configurations (e.g., SQL SERVERS) and non-database configurations.

According to an example embodiment, the selective spatial audio communication system 102 may include a memory 116 that may store the first set of audio data 106. In this context, a "memory" may include a single memory device or multiple memory devices configured to store data and/or instructions. Further, the memory 116 may span multiple distributed storage devices.

According to an example embodiment, a user interface component 118 may manage communications between a user 120 and the selective spatial audio communication system 102. The user 120 may be associated with a receiving device 122 that may be associated with a display 124 and other input/output devices. For example, the display 124 may be configured to communicate with the receiving device 122, via internal device bus communications, or via at least one network connection.

According to an example embodiment, the selective spatial audio communication system 102 may include a network communication component 126 that may manage network communication between the selective spatial audio communication system 102 and other entities that may communicate with the selective spatial audio communication system 102 via at least one network 128. For example, the at least one network 128 may include at least one of the Internet, at least one wireless network, or at least one wired network. For example, the at least one network 128 may include a cellular network, a radio network, or any type of network that may support transmission of data for the selective spatial audio communication system 102. For example, the network communication component 126 may manage network communications between the selective spatial audio communication system 102 and the receiving device 122. For example, the network communication component 126 may manage network communication between the user interface component 118 and the receiving device 122.

Figure 1B:
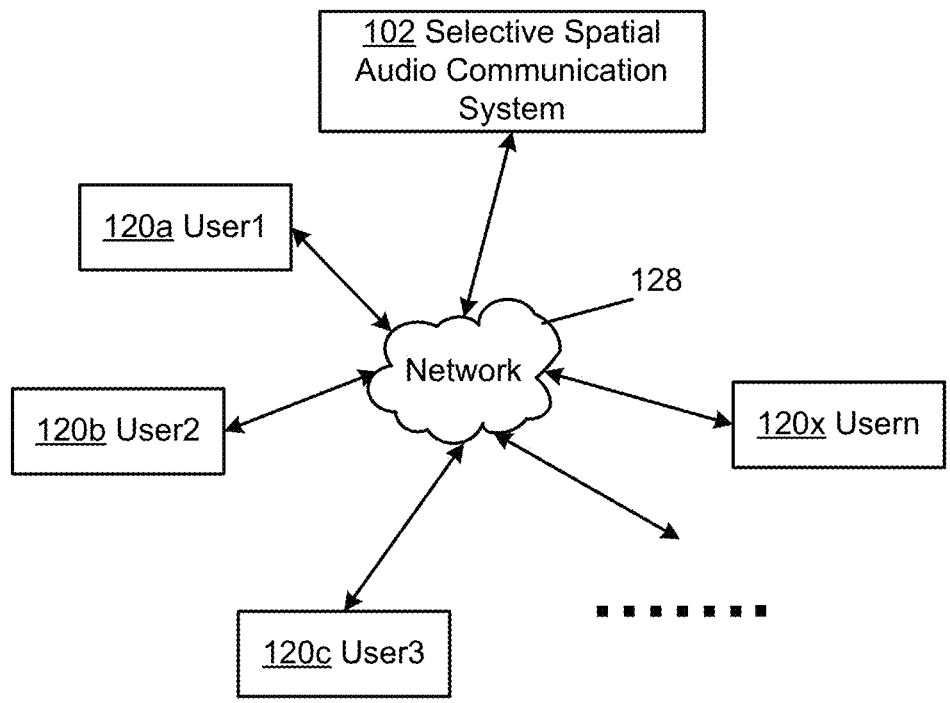
Figure 2A:
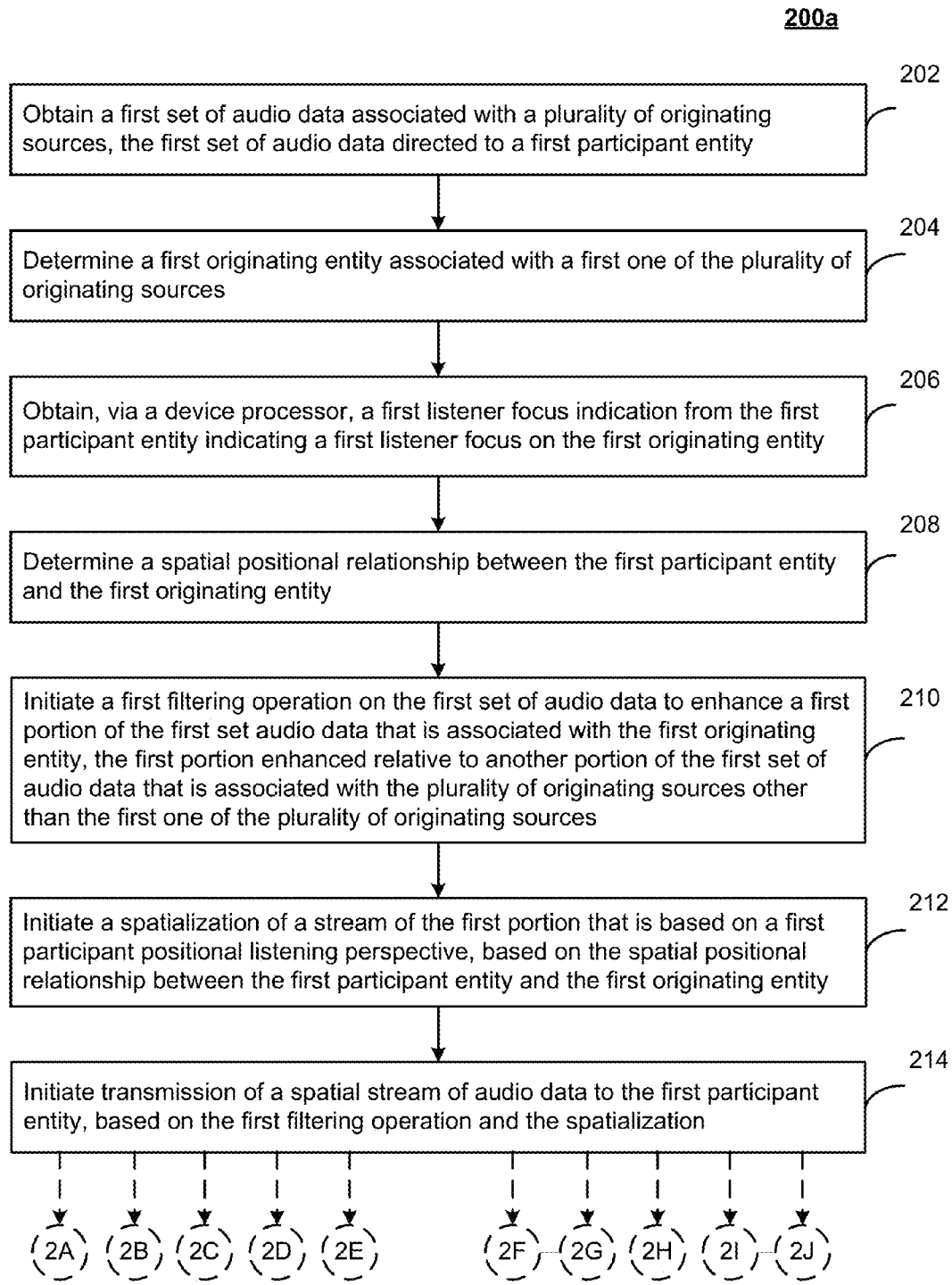
FIG. 2 is a flowchart illustrating example operations of the system of FIG. 1.
Figure 2B:
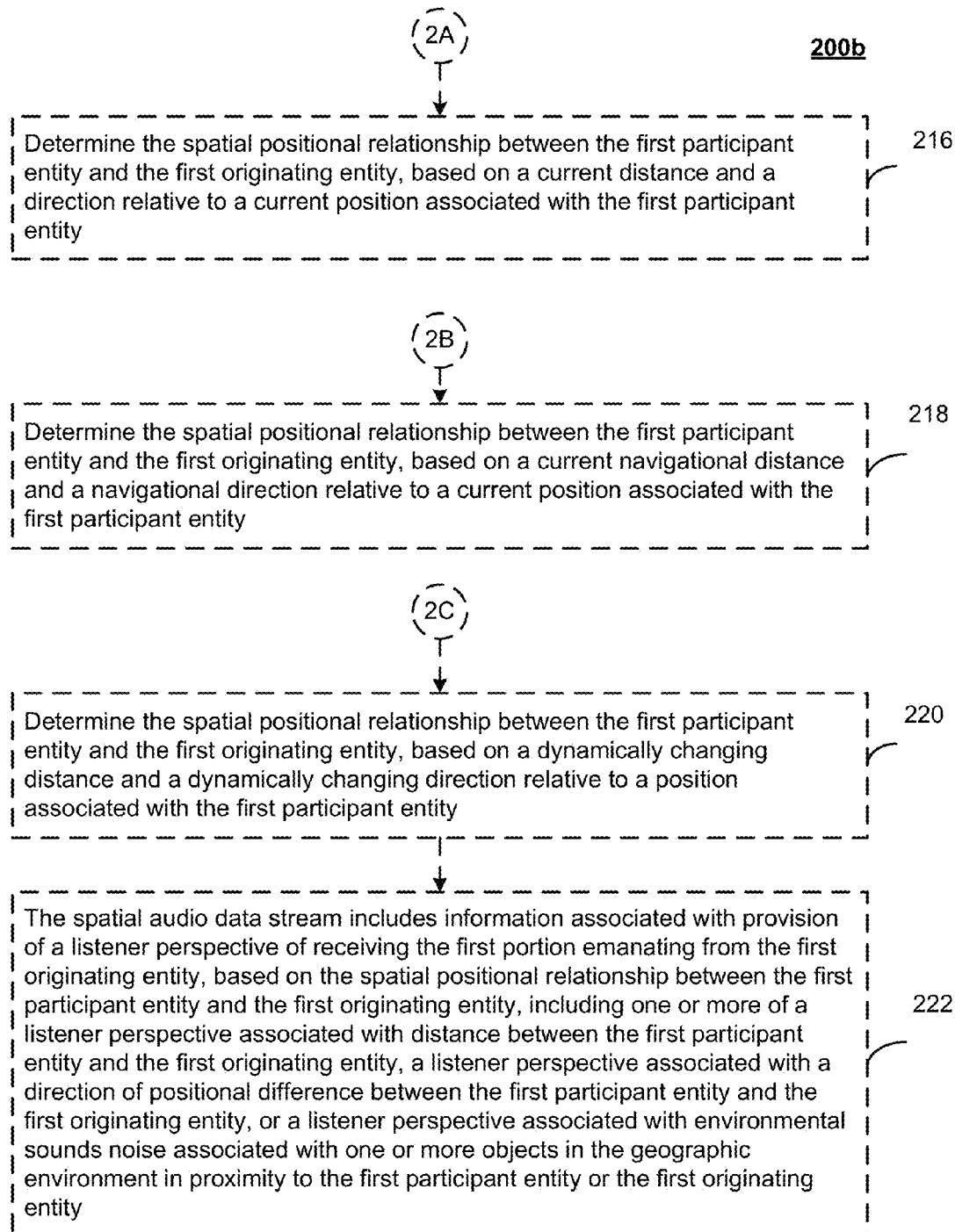
Figure 2C:
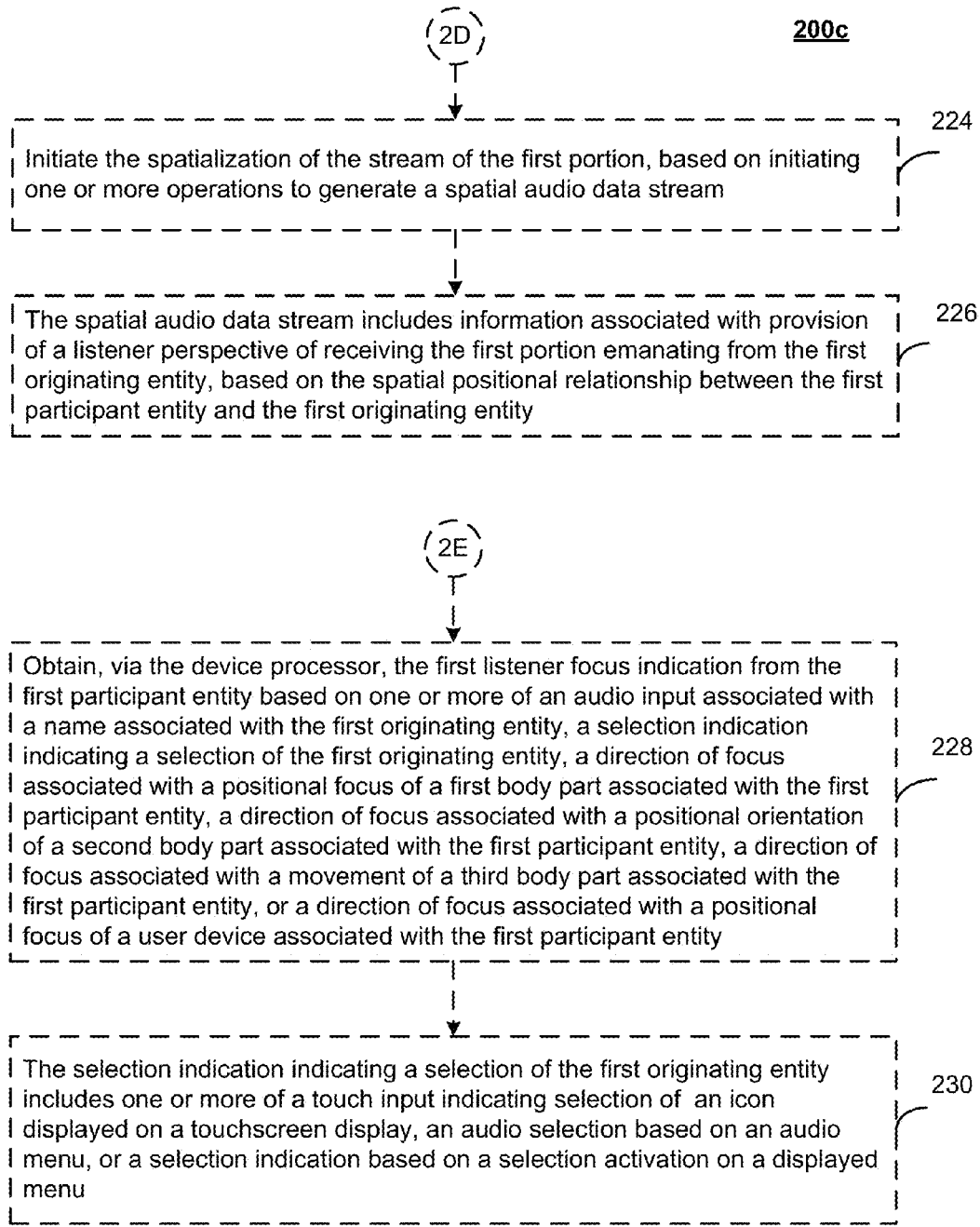
Figure 2D:
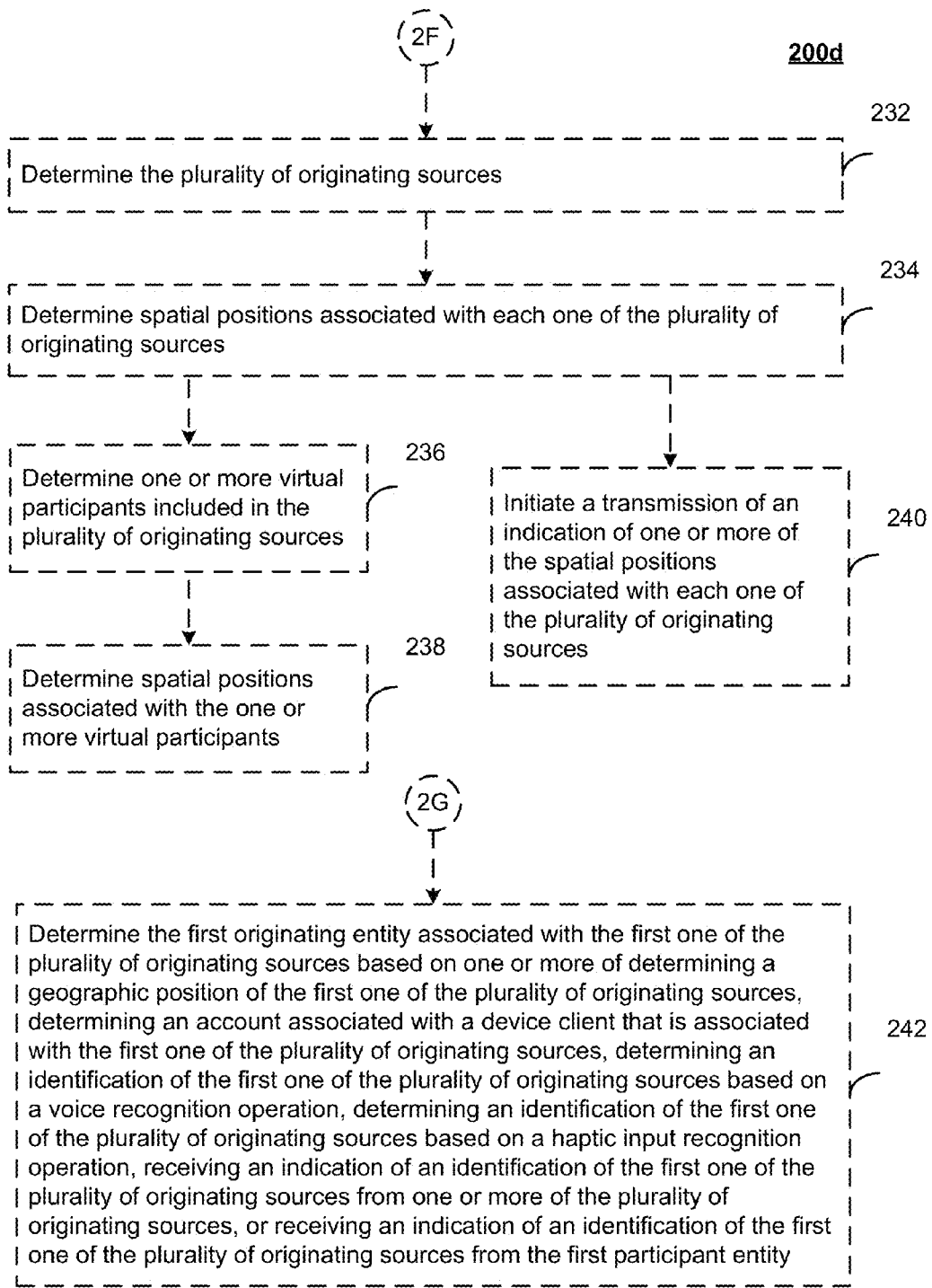
Figure 2E:
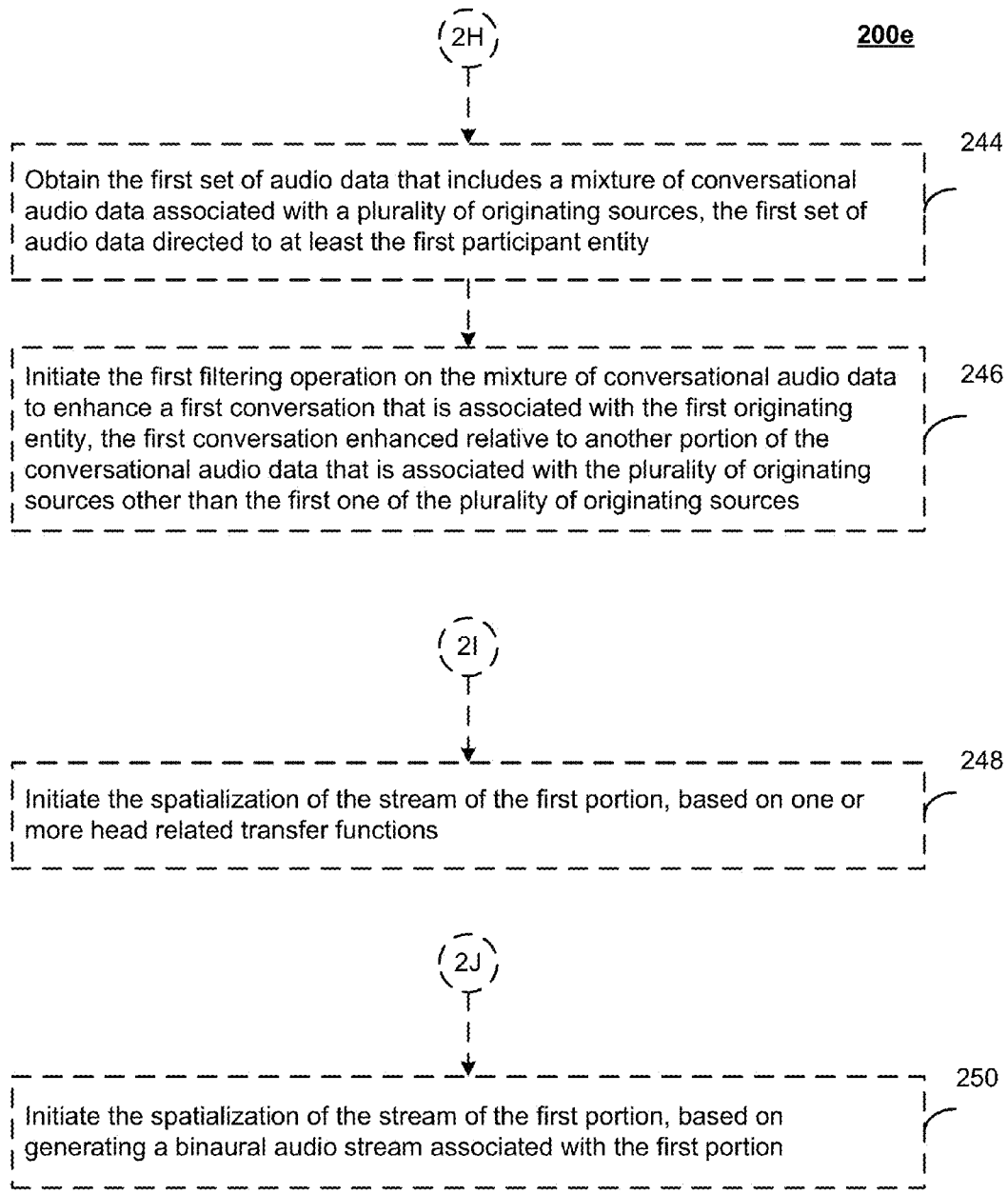

As shown in FIG. 1b, the user 120 may include a plurality of users 120a, 120b, 120c, . . . , 120x. Each user 120 may also be associated with a respective receiving device 122 and/or display 124. Thus, each of the users 120a, 120b, 120c, . . . , 120x may include one or more of the originating sources 108 and the first participant entity 110.

An audio source determination component 130 may determine a first originating entity 132 associated with a first one of the plurality of originating sources 108. For example, an originating entity may be determined based on a user identification. For example, the originating entity may be determined based on an actual or virtual location associated with the originating entity.

A focus determination component 134 may obtain, via a device processor 136, a first listener focus indication 138 from the first participant entity 110 indicating a first listener focus 140 on the first originating entity 132. For example, the first participant entity 110 may provide a selection indication indicating a request for a listener focus on the first originating entity 132. For example, the first participant entity 110 may change his/her body orientation in a direction toward a location associated with the first originating entity 132. For example, the first participant entity 110 may utter a name or label associated with the first originating entity 132. For example, the first participant entity 110 may provide a selection indication based on activating an icon or other graphical symbol(s) on a display and/or menu.

In this context, a "processor" may include a single processor or multiple processors configured to process instructions associated with a processing system. A processor may thus include multiple processors processing instructions in parallel and/or in a distributed manner. Although the device processor 136 is depicted as external to the selective spatial audio communication system 102 in FIG. 1, one skilled in the art of data processing will appreciate that the device processor 136 may be implemented as a single component, and/or as distributed units which may be located internally or externally to the selective spatial audio communication system 102, and/or any of its elements.

According to an example embodiment, the selective spatial audio communication system 102 may communicate directly (not shown in FIG. 1) with the receiving device 122, instead of via the network 128, as depicted in FIG. 1. For example, the selective spatial audio communication system 102 may reside on one or more backend servers, or on a desktop device, or on a mobile device. For example, although not shown in FIG. 1, the user 120 may interact directly with the receiving device 122, which may host at least a portion of the selective spatial audio communication system 102, at least a portion of the device processor 136, and the display 124. According to example embodiments, portions of the system 100 may operate as distributed modules on multiple devices, or may communicate with other portions via one or more networks or connections, or may be hosted on a single device.

A spatial relationship component 142 may determine a spatial positional relationship 144 between the first participant entity 110 and the first originating entity 132. For example, the spatial positional relationship 144 may include a three-dimensional (3-D) spatial relationship 144 (e.g., left, right, of each other, above, below each other, in front of, behind each other, close to each other, far away from each other, separated by navigational obstacles). For example, an array of microphones may be used to determine spatial relationships among speaking participants. For example, cameras and other sensors may determine positional attributes associated with physical participating entities.

For example, many devices may include sensors such as accelerometers, gyroscopes, and/or magnetometers. For example, an accelerometer may provide a measurement of linear acceleration. For example, a gyroscope may provide a measurement of rotational acceleration. For example, a magnetometer may provide a measurement of magnetic fields in three directions (e.g., a three-axis compass). Thus, it may be possible to anticipate an imminent head angle associated with a moving participant, based on a current orientation, speed, and angle of the head (e.g., if sensors are included in a device that is attached to the head associated with the participant).

An audio enhancement component 146 may initiate a first filtering operation on the first set of audio data 106 to enhance a first portion 148 of the first set audio data 106 that is associated with the first originating entity 132, the first portion 148 enhanced relative to another portion 150 of the first set of audio data 106 that is associated with the plurality of originating sources 108 other than the first one of the plurality of originating sources 108. For example, the first filtering operation may substantially filter out sounds other than sounds associated with the first originating entity 132. For example, the first filtering operation may filter out a plurality of sounds other than sounds associated with the first originating entity 132, for a relative emphasis of sounds associated with the first originating entity 132, against background sounds to the first originating entity 132.

A spatialization component 152 may initiate a spatialization of a stream of the first portion 148 that is based on a first participant positional listening perspective 154, based on the spatial positional relationship 144 between the first participant entity 110 and the first originating entity 132. For example, the stream of the first portion 148 may be "spatialized" to include information that provides participant positional listening perspectives with regard to spatial positional relationships between/among the participant entities. For example, a spatialization of the stream of the first portion 148 may be accomplished via use of head related transfer functions, as discussed further herein. For example, a spatialization of the stream of the first portion 148 may include determining binaural formatted audio data based on the spatial positional relationships between/among the participant entities.

A spatial audio transmission component 156 may initiate transmission of a spatial stream 158 of audio data to the first participant entity 110, based on the first filtering operation and the spatialization.

According to an example embodiment, the spatial relationship component 142 may determine the spatial positional relationship 144 between the first participant entity 110 and the first originating entity 132, based on a current distance 160 and a direction 162 relative to a current position 164 associated with the first participant entity 110. For example, the spatial positional relationship 144 may dynamically change as either (or both) of the participants/entities moves, or as a location moves that is associated with one or more of the participants/entities.

According to an example embodiment, the spatial relationship component 142 may determine the spatial positional relationship 144 between the first participant entity 110 and the first originating entity 132, based on a current navigational distance 166 and a navigational direction 168 relative to a current position 164 associated with the first participant entity 110. For example, if the first participant entity 110 and the first originating entity 132 are separated by walls, fences, or other navigational obstacles, the current navigational distance 166 may include a distance included in navigating the navigational obstacles, and the navigational direction 168 may include provisions for the navigation of the navigational obstacles (e.g., left/right turns for navigating around the navigational obstacles, up and down directions for ascending or descending inclines or stairs).

According to an example embodiment, the spatial relationship component 142 may determine the spatial positional relationship 144 between the first participant entity 110 and the first originating entity 132, based on a dynamically changing distance 160 and a dynamically changing direction 162 relative to a position 164 associated with the first participant entity 110.

According to an example embodiment, the spatial audio data stream 158 may include information associated with provision of a listener perspective of receiving the first portion 148 emanating from the first originating entity 132, based on the spatial positional relationship 144 between the first participant entity 110 and the first originating entity 132, including one or more of a listener perspective associated with distance between the first participant entity 110 and the first originating entity 132, a listener perspective associated with a direction of positional difference between the first participant entity 110 and the first originating entity 132, or a listener perspective associated with environmental sounds noise associated with one or more objects in the geographic environment in proximity to the first participant entity 110 or the first originating entity 132.

According to an example embodiment, the spatialization component 152 may initiate the spatialization of the stream of the first portion 148, based on initiating one or more operations to generate a spatial audio data stream 158.

According to an example embodiment, the spatial audio data stream 158 may include information associated with provision of a listener perspective of receiving the first portion 148 emanating from the first originating entity 132, based on the spatial positional relationship 144 between the first participant entity 110 and the first originating entity 132.

According to an example embodiment, the focus determination component 134 may obtain, via the device processor 136, the first listener focus indication 138 from the first participant entity 110 based on one or more of an audio input 170 associated with a name associated with the first originating entity 132, a selection indication indicating a selection 172 of the first originating entity 132, a direction of focus 174 associated with a positional focus of a first body part associated with the first participant entity 110, a direction of focus 174 associated with a positional orientation 176 of a second body part associated with the first participant entity 110, a direction of focus 174 associated with a movement of a third body part associated with the first participant entity 110, or a direction of focus 174 associated with a positional focus of a user device associated with the first participant entity 110. For example, the first listener focus indication 138 may be based on a positional focus of a mobile phone manipulated by the first participant entity 110 to point to another participant, or to an object representing another participant. For example, the first listener focus indication 138 may be based on a positional focus of the eyes of the first participant entity 110. For example, the first listener focus indication 138 may be based on a gesture of the first participant entity 110 (e.g., finger pointing to another participant, or to an object representing another participant). For example, the first listener focus indication 138 may be based on a natural conversational (audio) mention by the first participant entity 110 of a name or label associated with another participant.

According to an example embodiment, the selection indication indicating a selection 172 of the first originating entity 132 may include one or more of a touch input indicating selection of an icon displayed on a touchscreen display, an audio selection based on an audio menu, or a selection indication based on a selection activation on a displayed menu.

According to an example embodiment, a group determination component 178 may determine the plurality of originating sources 108. For example, the group determination component 178 may determine members of a group of participant entities (any or all of whom may include originating sources 108).

According to an example embodiment, a group position determination component 180 may determine spatial positions 182 associated with each one of the plurality of originating sources 108.

According to an example embodiment, a virtual participant determination component 184 may determine one or more virtual participants 186 included in the plurality of originating sources 108. For example, virtual participants 186 may include participating entities who may be located in a geographic locale that is separate from other participants. For example, virtual participants 186 may include participating entities who may record audio data prior to a dynamic conversation among entities currently physically present. For example, virtual participants 186 may include participating entities who may include computerized entities (e.g., via artificial intelligence techniques).

According to an example embodiment, the group position determination component 180 may determine spatial positions 182 associated with the one or more virtual participants 186. For example, the spatial positions 182 may be determined via Global Positioning (GPS) coordinates obtained via devices associated with the virtual participants 186. For example, the spatial positions 182 may be provided by the virtual participants 186. For example, the spatial positions 182 may be provided by a requesting participant.

According to an example embodiment, a group position transmission component 188 may initiate a transmission of an indication of one or more of the spatial positions 182 associated with each one of the plurality of originating sources 108.

According to an example embodiment, the audio source determination component 130 may determine the first originating entity 132 associated with the first one of the plurality of originating sources 108 based on one or more of determining a geographic position 164 of the first one of the plurality of originating sources 108, determining an account associated with a device client that is associated with the first one of the plurality of originating sources 108, determining an identification of the first one of the plurality of originating sources 108 based on a voice recognition operation, determining an identification of the first one of the plurality of originating sources 108 based on a haptic input recognition operation, receiving an indication of an identification of the first one of the plurality of originating sources 108 from one or more of the plurality of originating sources 108, or receiving an indication of an identification of the first one of the plurality of originating sources 108 from the first participant entity 110.

According to an example embodiment, the audio data acquisition component 104 may obtain the first set of audio data 106 that includes a mixture of conversational audio data associated with a plurality of originating sources 108, the first set of audio data 106 directed to at least the first participant entity 110.

According to an example embodiment, the audio enhancement component 146 may initiate the first filtering operation on the mixture of conversational audio data to enhance a first conversation that is associated with the first originating entity 132, the first conversation enhanced relative to another portion of the conversational audio data that is associated with the plurality of originating sources 108 other than the first one of the plurality of originating sources 108.

According to an example embodiment, the spatialization component 152 may initiate the spatialization of the stream of the first portion 148, based on one or more head related transfer functions 190. For example a head related transfer function may be based on one or more mathematical models that may simulate the shape of a head of a person, and/or the structure of the parts of the ears of a person. For example, the mathematical models may use frequency shifting and phase shifting techniques to modify audio data to provide a listener perspective that the associated sounds are emanating from particular points in 3-D space (i.e., "spatialized audio"). With the aid of sensors to detect head movement (e.g., to determine ear orientation) of a participant, the spatialized audio may be dynamically adjusted to conform with dynamic movement of the head of the participant entity.

According to an example embodiment, the spatialization component 152 may initiate the spatialization of the stream of the first portion 148, based on generating a binaural audio stream associated with the first portion 148.

FIG. 2 is a flowchart illustrating example operations of the system of FIG. 1, according to example embodiments. In the example of FIG. 2*a*, a first set of audio data associated with a plurality of originating sources may be obtained, the first set of audio data directed to a first participant entity (202). For example, the audio data acquisition component 104 may obtain the first set of audio data 106 associated with a plurality of originating sources 108, the first set of audio data 106 directed to a first participant entity 110, as discussed above.

A first originating entity associated with a first one of the plurality of originating sources may be determined (204). For example, the audio source determination component 130 may determine the first originating entity 132 associated with a first one of the plurality of originating sources 108, as discussed above.

A first listener focus indication may be obtained from the first participant entity indicating a first listener focus on the first originating entity (206). For example, the focus determination component 134 may obtain, via the device processor 136, the first listener focus indication 138 from the first participant entity 110 indicating a first listener focus 140 on the first originating entity 132, as discussed above.

A spatial positional relationship between the first participant entity and the first originating entity may be determined (208). For example, the spatial relationship component 142 may determine the spatial positional relationship 144 between the first participant entity 110 and the first originating entity 132, as discussed above.

A first filtering operation may be initiated on the first set of audio data to enhance a first portion of the first set audio data that is associated with the first originating entity, the first portion enhanced relative to another portion of the first set of audio data that is associated with the plurality of originating sources other than the first one of the plurality of originating sources (210). For example, the audio enhancement component 146 may initiate a first filtering operation on the first set of audio data 106 to enhance a first portion 148 of the first set audio data 106 that is associated with the first originating entity 132, the first portion 148 enhanced relative to another portion 150 of the first set of audio data 106 that is associated with the plurality of originating sources 108 other than the first one of the plurality of originating sources 108, as discussed above.

A spatialization of a stream of the first portion that is based on a first participant positional listening perspective may be initiated, based on the spatial positional relationship between the first participant entity and the first originating entity (212). For example, the spatialization component 152 may initiate a spatialization of a stream of the first portion 148 that is based on a first participant positional listening perspective 154, based on the spatial positional relationship 144 between the first participant entity 110 and the first originating entity 132, as discussed above.

Transmission of a spatial stream of audio data to the first participant entity may be initiated, based on the first filtering operation and the spatialization (214). For example, the spatial audio transmission component 156 may initiate transmission of a spatial stream 158 of audio data to the first participant entity 110, based on the first filtering operation and the spatialization, as discussed above.

According to an example embodiment, the spatial positional relationship between the first participant entity and the first originating entity may be determined, based on a current distance and a direction relative to a current position associated with the first participant entity (216). For example, the spatial relationship component 142 may determine the spatial positional relationship 144 between the first participant entity 110 and the first originating entity 132, based on a current distance 160 and a direction 162 relative to a current position 164 associated with the first participant entity 110, as discussed above.

According to an example embodiment, the spatial positional relationship between the first participant entity and the first originating entity may be determined, based on a current navigational distance and a navigational direction relative to a current position associated with the first participant entity (218). For example, the spatial relationship component 142 may determine the spatial positional relationship 144 between the first participant entity 110 and the first originating entity 132, based on a current navigational distance 166 and a navigational direction 168 relative to a current position 164 associated with the first participant entity 110, as discussed above.

According to an example embodiment, the spatial positional relationship between the first participant entity and the first originating entity may be determined, based on a dynamically changing distance and a dynamically changing direction relative to a position associated with the first participant entity (220). For example, the spatial relationship component 142 may determine the spatial positional relationship 144 between the first participant entity 110 and the first originating entity 132, based on a dynamically changing distance 160 and a dynamically changing direction 162 relative to a position 164 associated with the first participant entity 110, as discussed above.

According to an example embodiment, the spatial audio data stream may include information associated with provision of a listener perspective of receiving the first portion emanating from the first originating entity, based on the spatial positional relationship between the first participant entity and the first originating entity, including one or more of a listener perspective associated with distance between the first participant entity and the first originating entity, a listener perspective associated with a direction of positional difference between the first participant entity and the first originating entity, or a listener perspective associated with environmental sounds noise associated with one or more objects in the geographic environment in proximity to the first participant entity or the first originating entity (222). For example, the spatial audio data stream 158 may include information associated with provision of a listener perspective of receiving the first portion 148 emanating from the first originating entity 132, based on the spatial positional relationship 144 between the first participant entity 110 and the first originating entity 132, including one or more of a listener perspective associated with distance between the first participant entity 110 and the first originating entity 132, a listener perspective associated with a direction of positional difference between the first participant entity 110 and the first originating entity 132, or a listener perspective associated with environmental sounds noise associated with one or more objects in the geographic environment in proximity to the first participant entity 110 or the first originating entity 132, as discussed above.

According to an example embodiment, the spatialization of the stream of the first portion may be initiated, based on initiating one or more operations to generate a spatial audio data stream (224). For example, the spatialization component 152 may initiate the spatialization of the stream of the first portion 148, based on initiating one or more operations to generate a spatial audio data stream 158, as discussed above.

According to an example embodiment, the spatial audio data stream may include information associated with provision of a listener perspective of receiving the first portion emanating from the first originating entity, based on the spatial positional relationship between the first participant entity and the first originating entity (226).

According to an example embodiment, the first listener focus indication may be obtained from the first participant entity based on one or more of an audio input associated with a name associated with the first originating entity, a selection indication indicating a selection of the first originating entity, a direction of focus associated with a positional focus of a first body part associated with the first participant entity, a direction of focus associated with a positional orientation of a second body part associated with the first participant entity, a direction of focus associated with a movement of a third body part associated with the first participant entity, or a direction of focus associated with a positional focus of a user device associated with the first participant entity (228). For example, the focus determination component 134 may obtain, via the device processor 136, the first listener focus indication 138 from the first participant entity 110 based on one or more of an audio input 170 associated with a name associated with the first originating entity 132, a selection indication indicating a selection 172 of the first originating entity 132, a direction of focus 174 associated with a positional focus of a first body part associated with the first participant entity 110, a direction of focus 174 associated with a positional orientation 176 of a second body part associated with the first participant entity 110, a direction of focus 174 associated with a movement of a third body part associated with the first participant entity 110, or a direction of focus 174 associated with a positional focus of a user device associated with the first participant entity 110, as discussed above.

According to an example embodiment, the selection indication indicating a selection of the first originating entity may include one or more of a touch input indicating selection of an icon displayed on a touchscreen display, an audio selection based on an audio menu, or a selection indication based on a selection activation on a displayed menu (230).

According to an example embodiment, the plurality of originating sources may be determined (232). For example, the group determination component 178 may determine the plurality of originating sources 108, as discussed above.

According to an example embodiment, spatial positions associated with each one of the plurality of originating sources may be determined (234). For example, the group position determination component 180 may determine spatial positions 182 associated with each one of the plurality of originating sources 108, as discussed above.

According to an example embodiment, one or more virtual participants included in the plurality of originating sources may be determined (236). For example, the virtual participant determination component 184 may determine one or more virtual participants 186 included in the plurality of originating sources 108, as discussed above.

According to an example embodiment, spatial positions associated with the one or more virtual participants may be determined (238). For example, the group position determination component 180 may determine spatial positions 182 associated with the one or more virtual participants 186, as discussed above.

According to an example embodiment, a transmission of an indication of one or more of the spatial positions associated with each one of the plurality of originating sources may be initiated (240). For example, the group position transmission component 188 may initiate a transmission of an indication of one or more of the spatial positions 182 associated with each one of the plurality of originating sources 108, as discussed above.

According to an example embodiment, the first originating entity associated with the first one of the plurality of originating sources may be determined based on one or more of determining a geographic position of the first one of the plurality of originating sources, determining an account associated with a device client that is associated with the first one of the plurality of originating sources, determining an identification of the first one of the plurality of originating sources based on a voice recognition operation, determining an identification of the first one of the plurality of originating sources based on a haptic input recognition operation, receiving an indication of an identification of the first one of the plurality of originating sources from one or more of the plurality of originating sources, or receiving an indication of an identification of the first one of the plurality of originating sources from the first participant entity (242). For example, the audio source determination component 130 may determine the first originating entity 132 associated with the first one of the plurality of originating sources 108 based on one or more of determining a geographic position 164 of the first one of the plurality of originating sources 108, determining an account associated with a device client that is associated with the first one of the plurality of originating sources 108, determining an identification of the first one of the plurality of originating sources 108 based on a voice recognition operation, determining an identification of the first one of the plurality of originating sources 108 based on a haptic input recognition operation, receiving an indication of an identification of the first one of the plurality of originating sources 108 from one or more of the plurality of originating sources 108, or receiving an indication of an identification of the first one of the plurality of originating sources 108 from the first participant entity 110, as discussed above.

According to an example embodiment, the first set of audio data that includes a mixture of conversational audio data associated with a plurality of originating sources may be obtained, the first set of audio data directed to at least the first participant entity (244). For example, the audio data acquisition component 104 may obtain the first set of audio data 106 that includes a mixture of conversational audio data associated with a plurality of originating sources 108, the first set of audio data 106 directed to at least the first participant entity 110, as discussed above.

According to an example embodiment, the first filtering operation on the mixture of conversational audio data may be initiated to enhance a first conversation that is associated with the first originating entity, the first conversation enhanced relative to another portion of the conversational audio data that is associated with the plurality of originating sources other than the first one of the plurality of originating sources (246). For example, the audio enhancement component 146 may initiate the first filtering operation on the mixture of conversational audio data to enhance a first conversation that is associated with the first originating entity 132, the first conversation enhanced relative to another portion of the conversational audio data that is associated with the plurality of originating sources 108 other than the first one of the plurality of originating sources 108, as discussed above.

According to an example embodiment, the spatialization of the stream of the first portion may be initiated, based on one or more head related transfer functions (248). For example, the spatialization component 152 may initiate the spatialization of the stream of the first portion 148, based on one or more head related transfer functions 190, as discussed above.

According to an example embodiment, the spatialization of the stream of the first portion may be initiated, based on generating a binaural audio stream associated with the first portion (250). For example, the spatialization component 152 may initiate the spatialization of the stream of the first portion 148, based on generating a binaural audio stream associated with the first portion 148, as discussed above.

Figure 3:
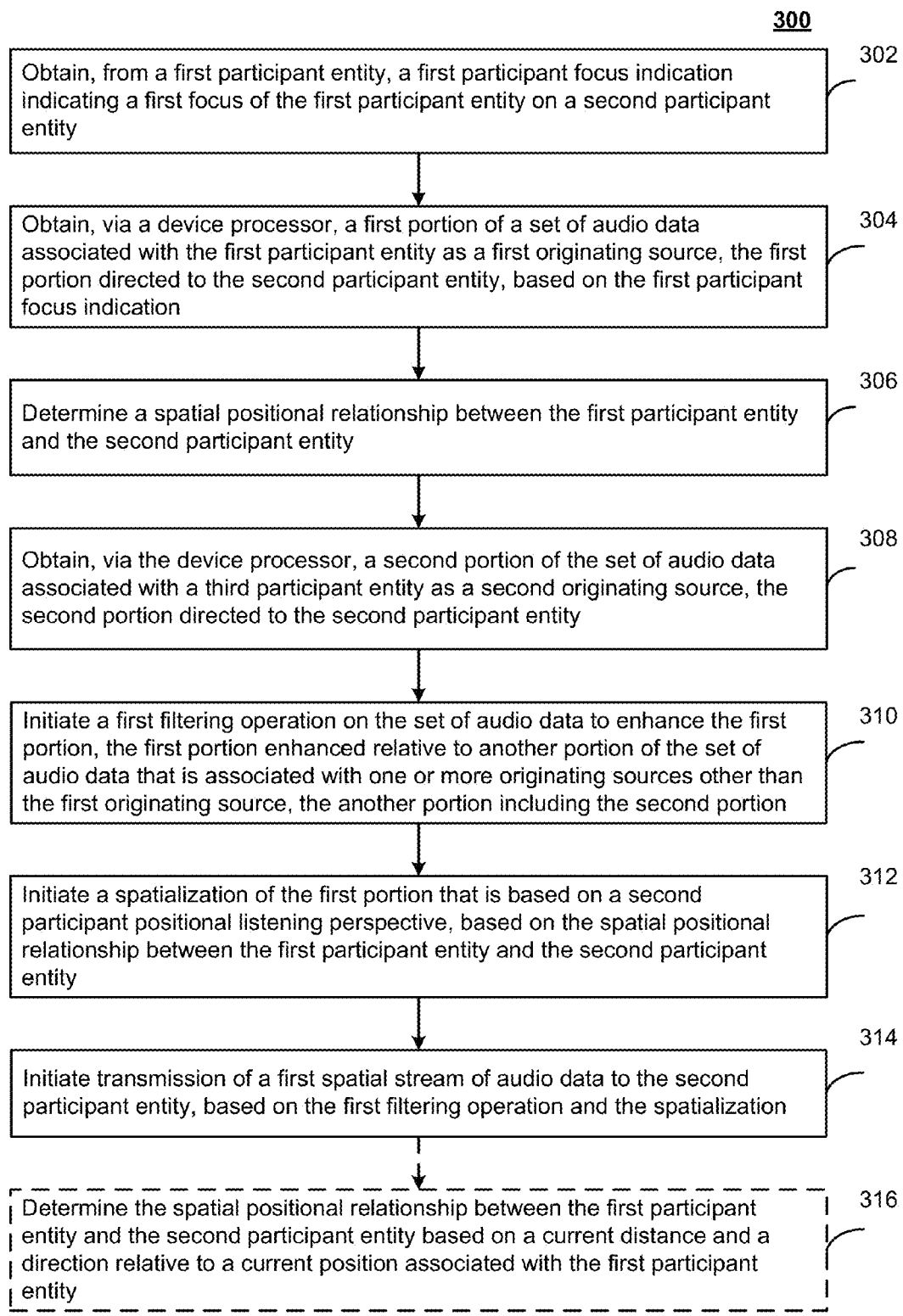
FIG. 3 is a flowchart illustrating example operations of the system of FIG. 1.

FIG. 3 is a flowchart illustrating example operations of the system of FIG. 1, according to example embodiments. In the example of FIG. 3, a first participant focus indication may be obtained from a first participant entity, indicating a first focus of the first participant entity on a second participant entity (302). For example, the focus determination component 134 may obtain, via the device processor 136, a first participant focus indication from a first participant entity, indicating a first focus of the first participant entity on a second participant entity, as discussed above.

A first portion of a set of audio data associated with the first participant entity as a first originating source may be obtained, the first portion directed to the second participant entity, based on the first participant focus indication (304). For example, the audio data acquisition component 104 may obtain the first set of audio data 106 associated with originating sources 108, the first set of audio data 106 directed to the first participant entity 110, as discussed above.

A spatial positional relationship between the first participant entity and the second participant entity may be determined (306). For example, the spatial relationship component 142 may determine a spatial positional relationship 144 between the first participant entity 110 and the first originating entity 132, as discussed above.

A second portion of the set of audio data associated with a third participant entity as a second originating source may be obtained, the second portion directed to the second participant entity (308). For example, the audio data acquisition component 104 may obtain the second portion, as discussed above.

A first filtering operation may be initiated on the set of audio data to enhance the first portion, the first portion enhanced relative to another portion of the set of audio data that is associated with one or more originating sources other than the first originating source, the another portion including the second portion (310). For example, the audio enhancement component 146 may initiate a first filtering operation on the first set of audio data 106 to enhance a first portion 148 of the first set audio data 106 that is associated with the first originating entity 132, the first portion 148 enhanced relative to another portion 150 of the first set of audio data 106 that is associated with the plurality of originating sources 108 other than the first one of the plurality of originating sources 108, as discussed above.

A spatialization of the first portion that is based on a second participant positional listening perspective may be initiated, based on the spatial positional relationship between the first participant entity and the second participant entity (312). For example, the spatialization component 152 may initiate the spatialization of a stream of the first portion 148 that is based on a second participant positional listening perspective 154, based on the spatial positional relationship 144 between the first participant entity 110 and the first originating entity 132, as discussed above.

Transmission of a first spatial stream of audio data to the second participant entity may be initiated, based on the first filtering operation and the spatialization (314). For example, the spatial audio transmission component 156 may initiate transmission of a spatial stream 158 of audio data to a participant entity 110, based on the first filtering operation and the spatialization, as discussed above.

According to an example embodiment, the spatial positional relationship between the first participant entity and the second participant entity may be determined based on a current distance and a direction relative to a current position associated with the first participant entity (316). For example, the spatial relationship component 142 may determine the spatial positional relationship 144 between the first participant entity 110 and the first originating entity 132, based on a current distance 160 and a direction 162 relative to a current position 164 associated with the first participant entity 110, as discussed above.

Figure 4A:
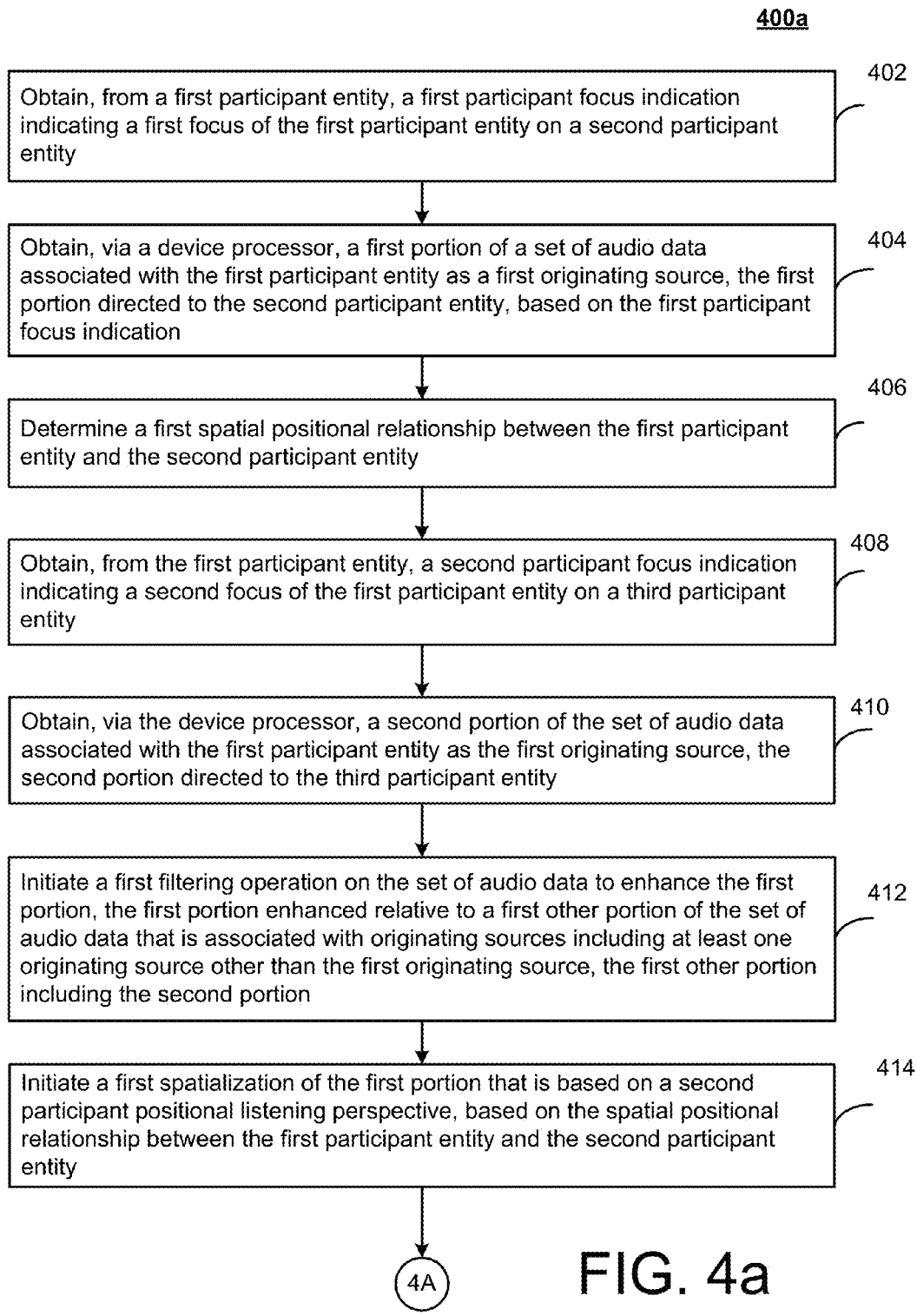
FIG. 4 is a flowchart illustrating example operations of the system of FIG. 1.
Figure 4B:
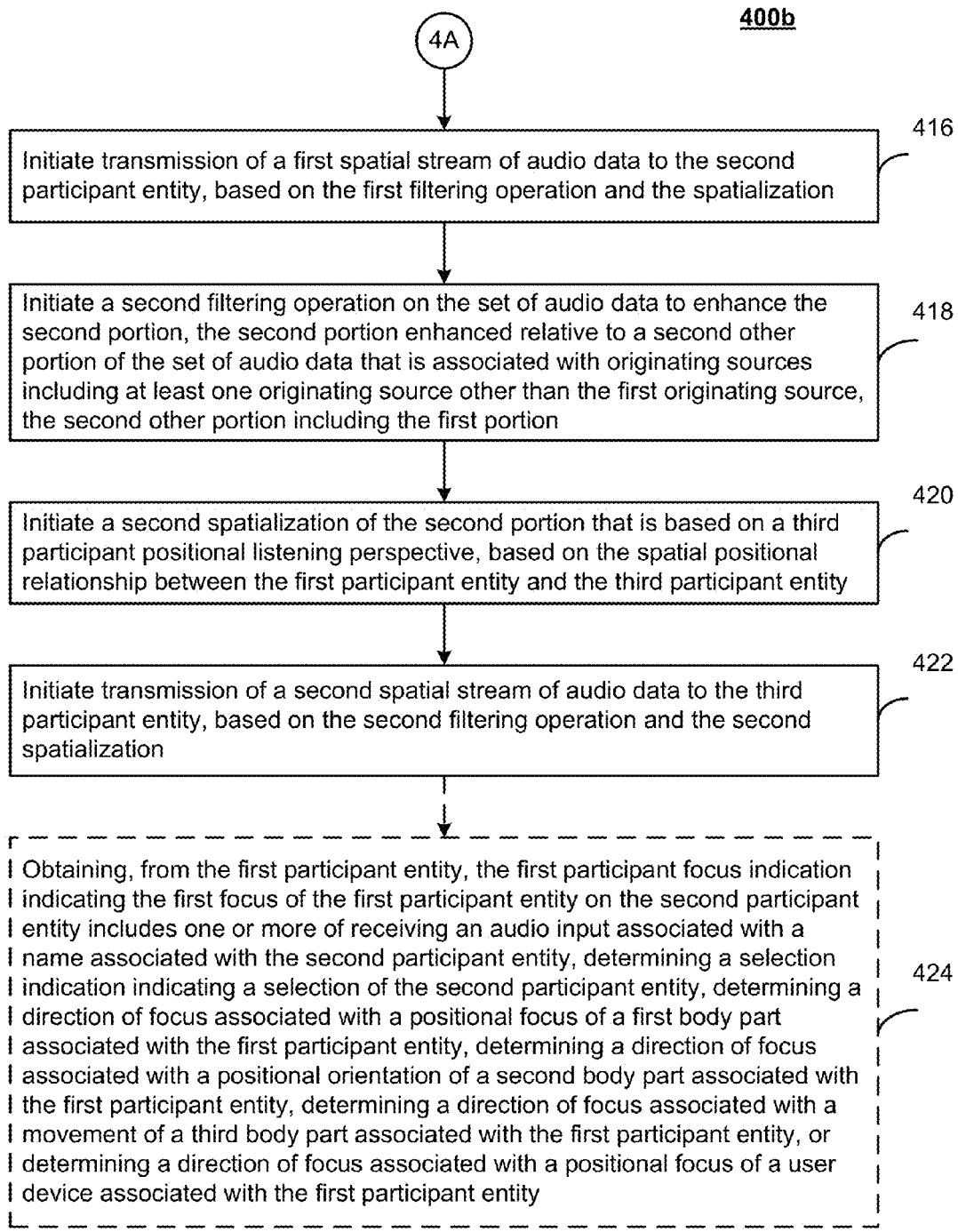

FIG. 4 is a flowchart illustrating example operations of the system of FIG. 1, according to example embodiments. In the example of FIG. 4a, a first participant focus indication may be obtained from a first participant entity, indicating a first focus of the first participant entity on a second participant entity (402). For example, the focus determination component 134 may obtain, via the device processor 136, a first participant focus indication from a first participant entity, indicating a first focus of the first participant entity on a second participant entity, as discussed above.

A first portion of a set of audio data associated with the first participant entity as a first originating source may be obtained, the first portion directed to the second participant entity, based on the first participant focus indication (404). For example, the audio data acquisition component 104 may obtain the first set of audio data 106 associated with originating sources 108, the first set of audio data 106 directed to the first participant entity 110, as discussed above.

A first spatial positional relationship between the first participant entity and the second participant entity may be determined (406). For example, the spatial relationship component 142 may determine a spatial positional relationship 144 between the first participant entity 110 and the first originating entity 132, as discussed above.

A second participant focus indication indicating a second focus of the first participant entity on a third participant entity may be obtained from the first participant entity (408). For example, the focus determination component 134 may obtain, via the device processor 136, the second focus of the first participant entity on a third participant entity, from the first participant entity.

A second portion of the set of audio data associated with the first participant entity as the first originating source may be obtained, the second portion directed to the third participant entity (410). For example, the audio data acquisition component 104 may obtain the second portion of the set of audio data associated with the first participant entity as the first originating source, the second portion directed to the third participant entity.

A first filtering operation may be initiated on the set of audio data to enhance the first portion, the first portion enhanced relative to a first other portion of the set of audio data that is associated with originating sources including at least one originating source other than the first originating source, the first other portion including the second portion (412). For example, the audio enhancement component 146 may initiate a first filtering operation on the first set of audio data 106 to enhance a first portion 148 of the first set audio data 106 that is associated with the first originating entity 132, the first portion 148 enhanced relative to another portion 150 of the first set of audio data 106 that is associated with the plurality of originating sources 108 other than the first one of the plurality of originating sources 108, as discussed above.

A first spatialization of the first portion that is based on a second participant positional listening perspective may be initiated, based on the spatial positional relationship between the first participant entity and the second participant entity (414). For example, the spatialization component 152 may initiate the spatialization of a stream of the first portion 148 that is based on a second participant positional listening perspective 154, based on the spatial positional relationship 144 between the first participant entity 110 and the first originating entity 132, as discussed above.

Transmission of a first spatial stream of audio data to the second participant entity may be initiated, based on the first filtering operation and the spatialization (416). For example, the spatial audio transmission component 156 may initiate transmission of a spatial stream 158 of audio data to a participant entity 110, based on the first filtering operation and the spatialization, as discussed above.

A second filtering operation may be initiated on the set of audio data to enhance the second portion, the second portion enhanced relative to a second other portion of the set of audio data that is associated with originating sources including at least one originating source other than the first originating source, the second other portion including the first portion (418). For example, the audio enhancement component 146 may initiate the second filtering operation on the set of audio data to enhance the second portion.

A second spatialization of the second portion that is based on a third participant positional listening perspective may be initiated, based on the spatial positional relationship between the first participant entity and the third participant entity (420). For example, the spatialization component 152 may initiate the second spatialization of the second portion that is based on a third participant positional listening perspective.

Transmission of a second spatial stream of audio data may be initiated to the third participant entity, based on the second filtering operation and the second spatialization (422). For example, the spatial audio transmission component 156 may initiate transmission of a spatial stream 158 of audio data to a participant entity 110, based on the second filtering operation and the second spatialization, as discussed above.

According to an example embodiment, obtaining, from the first participant entity, the first participant focus indication indicating the first focus of the first participant entity on the second participant entity may include one or more of receiving an audio input associated with a name associated with the second participant entity, determining a selection indication indicating a selection of the second participant entity, determining a direction of focus associated with a positional focus of a first body part associated with the first participant entity, determining a direction of focus associated with a positional orientation of a second body part associated with the first participant entity, determining a direction of focus associated with a movement of a third body part associated with the first participant entity, or determining a direction of focus associated with a positional focus of a user device associated with the first participant entity (424).

According to an example embodiment, three-dimensional (3-D) spatialized (e.g., binaural) audio may be used to provide live communication streams (e.g., based on a "cocktail party" effect) to help communicating participants filter and localize information. For example, a user's head angle may be estimated based on a sensor that may be located in his/her pocket, or in a device attached to his/her head.

Example techniques discussed herein may utilize 3-D audio and/or haptic feedback as a basis for a user interface for selecting which information in a given set to focus or enhance for a particular communicating participant.

Example techniques discussed herein may utilize 3-D audio to indicate contextual information associated with a user's present environment (e.g., spatial notes, geofences) to provide information associated with location, direction and context associated with communicating participants.

Example techniques discussed herein may utilize 3-D audio and/or haptic feedback to provide information to users for finding locations, or for finding each other.

Example techniques discussed herein may provide a visual accompaniment menu (e.g., in combination with 3-D audio) for selecting which friends/family be resumed as active participants in a conversation.

Example techniques discussed herein may utilize a mathematical model referred to as a head related transfer function (HRTF), which may include a parameterized simplification of the physics of the human head (e.g., more particularly the ears). The HRTF may generate offsets and frequency changes in a single sound source as it may be independently received by human ears. A human brain may then reconstruct the 3-D effect (e.g., as the brain may process naturally occurring sounds).

Natural conversations may be persistent, even while not active. Thus, users may wish to indicate desired listener participants to whom they may wish to speak at various points in time. Thus, according to example embodiments, a user may select listeners based on one or more of an audio selection, a touch selection, or a directional selection.

According to an example embodiment, "friends" on a user's social network may be added to a conversation explicitly (i.e., known without seven or ten digit numbers or full names for dialing). Thus, a vocal selection may be initiated by uttering a sentence beginning with the recipient's name, and then routing the message appropriately. For such communications, transmission may be delayed for low-confidence matches. In such cases, the audio may be buffered and ask for confirmation may be requested after the utterance (e.g., before transmission). When confidence is sufficiently high, the communication may be transmitted without delay.

According to an example embodiment, a touch selection may be based on touching a friend's name or icon on a display, and talking may initiate transmission and routing of a message.

According to an example embodiment, a duration of touch may indicate a request to segment the message to avoid trailing noise. For example, a single short touch (e.g., less than one second duration) may activate recording, with a detection of silence to de-activate the recording activity.

According to an example embodiment, sustained touch may provide more fine-grained control of recording. For example, a touch may be used to activate recording, and a release of the touch may de-activate the recording activity.

According to an example embodiment, both short and sustained touch actions may be used to indicate durations of recording audio data.

According to example embodiments discussed herein, directional selection may indicate which participants may be included in an active conversation. For example, given a small set of active conversations and a larger set of dormant conversations, a participant may select among the active conversations by observing directional cues matching the direction of the spatialized audio. For example, if a first conversational participant is talking into a second conversational participant's left ear, then turning left may indicate that the second conversational participant is addressing the first conversational participant in conversation.

However, a participant may turn left because he/she rounded a corner in bodily navigation activities. Thus, walking/driving motions may be factored out from intentional rotations. Further, such movement may be sensed more reasonably via sensors located on a user's head, instead of included in a mobile phone. Thus, movement toward another participant may be sensed via rotation of a participant's body (e.g., not just the participant's head).

Further, such directional selections may be difficult to ascertain for more than a particular number of active conversation (e.g., six conversations). Thus, according to an example embodiment, an auditory menu may be used for selection of active participants. According to an example embodiment, audio feedback may be provided based on the selection (e.g., to ensure accuracy of the selection). For example, the system may provide audio feedback in the form of the name of a recipient (e.g., unless the conversation is an immediate response in an ongoing conversation).

According to an example embodiment, temporary buffering may be used for asynchronous functionality. For example, a sender phone may buffer audio for a relatively small, predetermined finite period if a recipient is unable to receive. After the predetermined period of time, the buffered audio may be uploaded to a cloud or transmitted to the recipient. On the other end, the recipient may buffer incoming audio if the recipient is not yet ready to listen.

According to an example embodiment, cached audio may be converted to transcript and back after a predetermined amount of time has passed (based on user permissions in user terms of service contracts), to reduce bandwidth and storage costs.

According to an example embodiment, adaptive algorithms that take into account the recent past and conversation patterns to help predict when the system may check for new audio data, more or less often (e.g., to aid in efficient use of system resources such as CPU and battery power).

According to an example embodiment, the spatial audio may be compressed as it is recorded, to conserve bandwidth.

According to an example embodiment, spatialization cues, such as 3-D position and orientation of speakers, may be sent to servers to determine potential significance of any changes before waking phones for receipt of new data, as without active voice information, the delay may not be noticeable is important to send at a modest frequency.

Example techniques discussed herein may mix and maintain multiple spatialized audio streams that may range from synchronous (e.g., full duplex conversation, including groups) to asynchronous such that users may "scrub" through conversations, listening, accelerating, and/or commenting at any point. Such techniques may involve a combination of client and server processing to enable timely and reliable delivery of audio information. For example, a user may generate a message that may be at least partially recorded for later listening by a listener participant.

According to an example embodiment, when the listener participant listens to the message, he/she may provide feedback at various points in the message, as response or comment to various features of the message (e.g., inline comments to an audio message). For example, the original sender of the message may receive feedback in the form of the inline audio comments, so that the original sender may understand what portions are referred to by the recipient's comments/feedback.

According to an example embodiment, when the listener participant listens to the message, he/she may speed up the playback of the recording to skip ahead to other portions of the message (e.g., without listening to the full message at the original speed of recording by the original sender of the message).

According to an example embodiment, if the listener participant listens to the message while the original sender is still recording a later portion of the message, the listener participant may "scrub", or skip ahead through the message, and may ultimately break into the message at the point where the original sender is currently recording, to initiate a live conversation between the original sender and the listener participant (e.g., no longer listening to the recording). Thus, the spatial audio message transmission may be switched from asynchronous to synchronous mode, based on the "scrubbing" activity.

Figure 5:
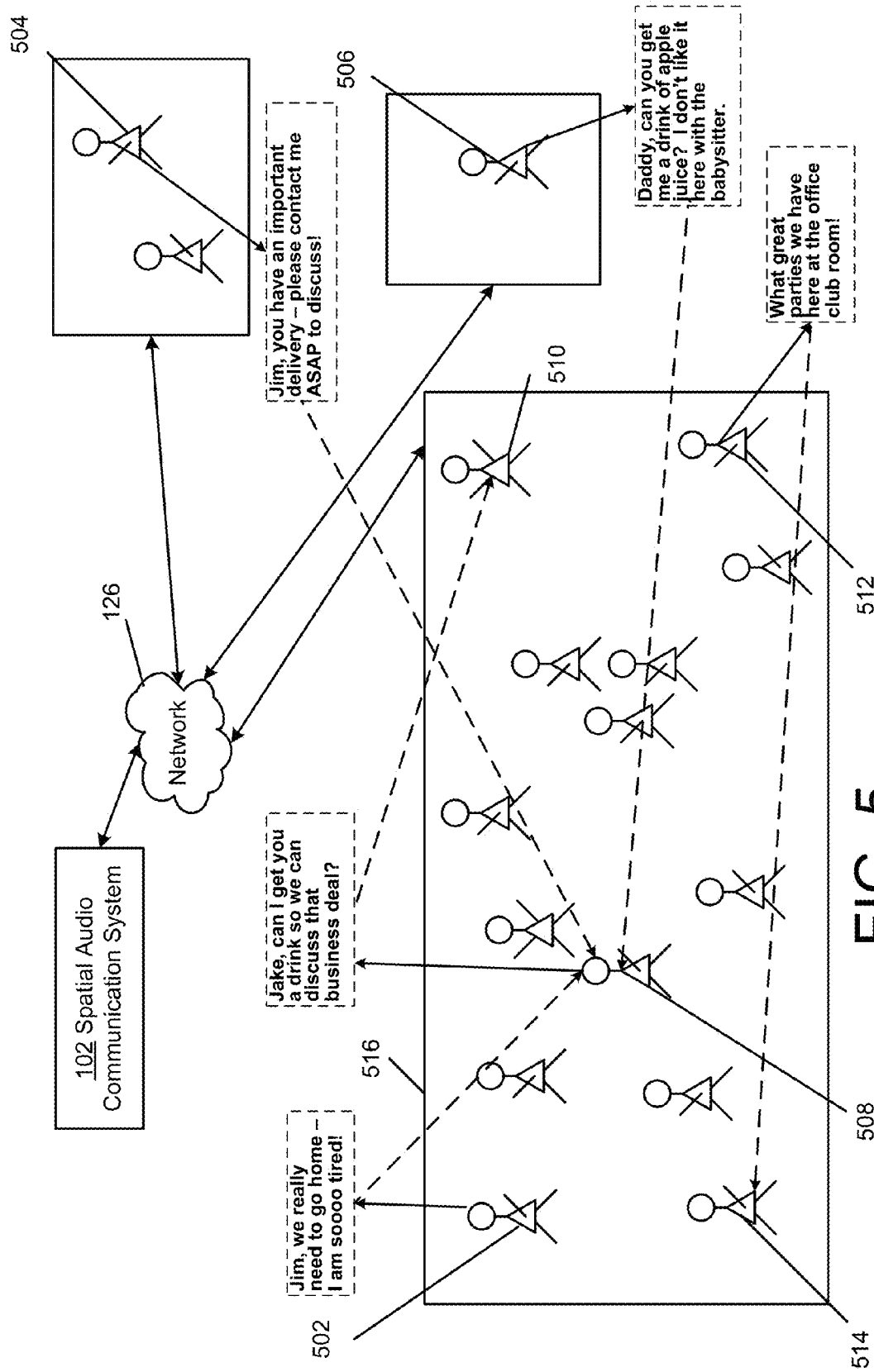
FIG. 5 depicts an example interaction with the system of FIG. 1.

FIG. 5 depicts an example interaction with the system of FIG. 1. As shown in FIG. 5, the selective spatial audio communication system 102 may obtain the first set of audio data 106 associated with a plurality of originating sources 108, the first set of audio data 106 directed to a first participant entity 110. For example, the plurality of originating sources 108 may include a first originating participant 502, a second originating participant 504, and a third originating participant 506. For example, the first participant entity 110 may include a first listener entity 508 named "Jim", or "Daddy" (as shown in FIG. 5).

As shown in FIG. 5, the first originating participant 502 may select "Jim" as a focus of conversation, based on the audio mention of "Jim", or based on a selection such as physically turning her head toward the first listener entity 508 as she begins to speak. For example, the first listener entity 508 may receive spatial audio data from the first originating participant 502 in a binaural format, such that the first listener entity 508 hears the received spatial audio data in a listener perspective of the speaker being positioned behind, and to the left of, the first listener entity 508.

Similarly, the first listener entity 508 may receive spatial audio data from the second originating participant 504 in a binaural format, such that the first listener entity 508 hears the received spatial audio data in a listener perspective of the speaker being positioned in front of, and to the left of, the first listener entity 508, in a different room. For example, the listener perspective may provide an effect of guidance around navigational obstacles (e.g., walls) to dynamically guide the first listener entity 508 in a path to the second originating participant 504. For example, the second originating participant 504 may include a virtual participant. For example, the conversation emanating from the second originating participant 504 may be excluded from a mixture of group conversational audio data obtained from a group of participants located in a same geographic locale.

Similarly, the first listener entity 508 may receive spatial audio data from the third originating participant 506 in a binaural format, such that the first listener entity 508 hears the received spatial audio data in a listener perspective of the speaker being positioned in front of, and slightly to the left of, the first listener entity 508, in a different room. For example, the listener perspective may provide an effect of guidance around navigational obstacles (e.g., walls) to dynamically guide the first listener entity 508 in a path to the third originating participant 506.

For example, the audio data may be transmitted to the first listener entity 508 as a conversational mixture of the conversations provided from the originating participants 502, 504, 506, or the audio data may be transmitted in separate streams. For example, the first listener entity 508 may select which one(s) of the originating participants 502, 504, 506 he wishes to hear at a particular time.

As shown in FIG. 5, the first listener entity 508 may also include an originating entity. For example, the first listener entity 508 may originate a conversation by selecting a second listener entity 510 named "Jake". For example, the first listener entity 508 may select "Jake" as a listener based on positioning his head to look toward "Jake" and then beginning his conversation with "Jake". For example, the action of turning a focus of attention on "Jake" may signal a desire to mute the conversations that may be received by "Jim" from the originating participants 502, 504, 506 while "Jim" speaks to "Jake". For example, the conversations that may be received by "Jim" from the originating participants 502, 504, 506 may be recorded until "Jim" signals a desire to listen. Thus, the conversations may be synchronous or asynchronous.

As shown in FIG. 5, a fourth originating participant 512 may initiate a conversation with a third listener entity 514. If desired, the conversation may be shared (e.g., made available) with all conversational participants in a room 516 (or other desired conversational grouping).

Figure 6:
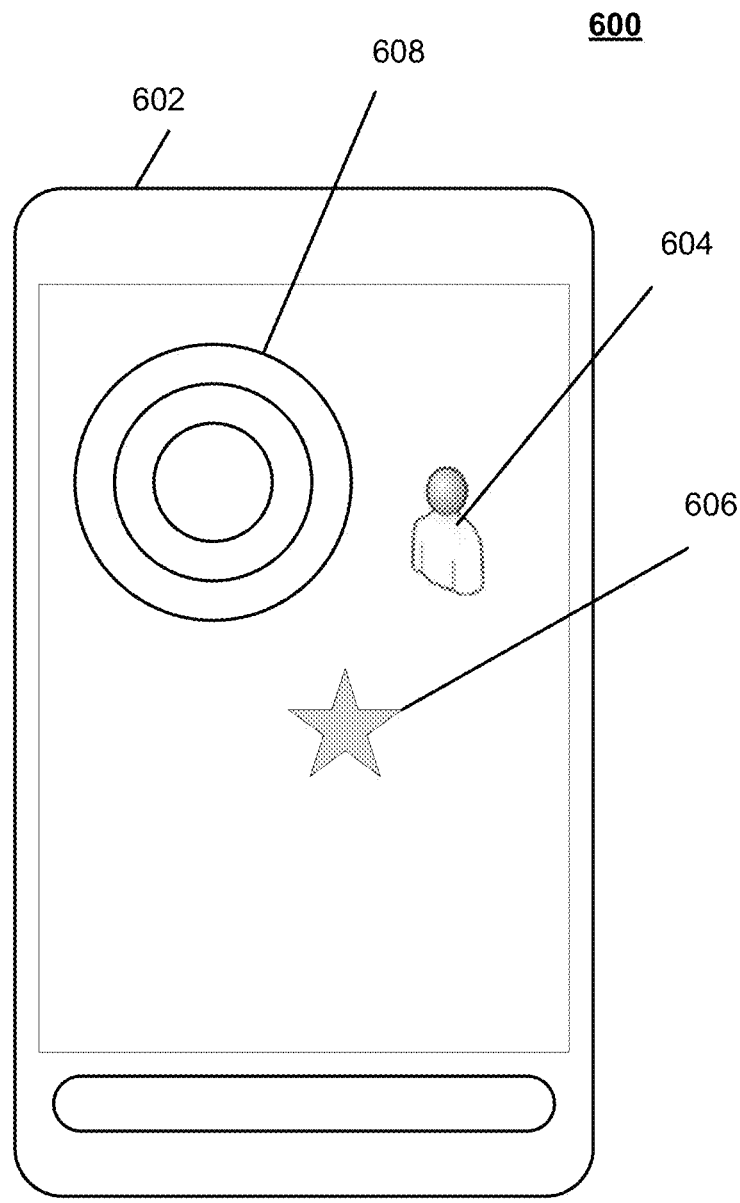
FIG. 6 depicts an example interaction with the system of FIG. 1.

FIG. 6 depicts an example interaction with the system of FIG. 1, according to an example embodiment. As shown in FIG. 6, a user device 602 may include a display indicating a participant 604 facing toward an entity 606. For example, the participant 604 may engage in a conversation with another participant located in a location corresponding to the entity 606. As shown in FIG. 6, a ripple 608 may indicate new audio data being transmitted by another participant. For example the participant 604 may provide an indication of a selection of receiving the new audio data by turning his/her head to the right (in the direction of eminence of the new audio data), or by touching the ripple 608 on the display to select the new data as his new listener focus of attention.

Example techniques discussed herein may thus provide selective spatial audio communications.

Customer privacy and confidentiality have been ongoing considerations in data processing environments for many years. Thus, example techniques for determining selective spatial audio communications may use data provided by users who have provided permission via one or more subscription agreements (e.g., "Terms of Service" (TOS) agreements) with associated applications or services associated with the selective spatial audio communications. For example, all parties may provide consent to being recorded, though it may be explicitly indicated (via a user accepted text agreement) that each party may control how recording occurs, and what level or duration of recording may be maintained, if any.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine usable or machine readable storage device (e.g., a magnetic or digital medium such as a Universal Serial Bus (USB) storage device, a tape, hard disk drive, compact disk, digital video disk (DVD), etc.) or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand alone program or as a module, component, subroutine, or other unit suitable for use in a computing environment. A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
an audio data acquisition component that obtains a first set of audio data associated with a plurality of originating sources, the first set of audio data directed to a first participant entity;
an audio source determination component that determines a first originating entity associated with a first one of the plurality of originating sources;
a focus determination component that obtains, via a device processor, a first listener focus indication from the first participant entity indicating a first listener focus on the first originating entity;

a spatial relationship component that determines a spatial positional relationship between the first participant entity and the first originating entity;

an audio enhancement component that initiates a first filtering operation on the first set of audio data to enhance a first portion of the first set audio data that is associated with the first originating entity, the first portion enhanced relative to another portion of the first set of audio data that is associated with the plurality of originating sources other than the first one of the plurality of originating sources;

a spatialization component that initiates a spatialization of a stream of the first portion that is based on a first participant positional listening perspective, based on the spatial positional relationship between the first participant entity and the first originating entity; and a spatial audio transmission component that initiates transmission of a spatial stream of audio data to the first participant entity, based on the first filtering operation and the spatialization.

2. The system of claim 1, wherein:

the spatial relationship component determines the spatial positional relationship between the first participant entity and the first originating entity, based on a current distance and a direction relative to a current position associated with the first participant entity.

3. The system of claim 1, wherein:

the spatial relationship component determines the spatial positional relationship between the first participant entity and the first originating entity, based on a current navigational distance and a navigational direction relative to a current position associated with the first participant entity.

4. The system of claim 1, wherein:

the spatial relationship component determines the spatial positional relationship between the first participant entity and the first originating entity, based on a dynamically changing distance and a dynamically changing direction relative to a position associated with the first participant entity.

5. The system of claim 4, wherein:

the spatial audio data stream includes information associated with provision of a listener perspective of receiving the first portion emanating from the first originating entity, based on the spatial positional relationship between the first participant entity and the first originating entity, including one or more of:
 a listener perspective associated with distance between the first participant entity and the first originating entity,
 a listener perspective associated with a direction of positional difference between the first participant entity and the first originating entity, or
 a listener perspective associated with environmental sounds noise associated with one or more objects in the geographic environment in proximity to the first participant entity or the first originating entity.

6. The system of claim 1, wherein:

the spatialization component initiates the spatialization of the stream of the first portion, based on initiating one or more operations to generate a spatial audio data stream, wherein the spatial audio data stream includes information associated with provision of a listener perspective of receiving the first portion emanating from the first originating entity, based on the spatial positional relationship between the first participant entity and the first originating entity.

7. The system of claim 1, wherein:

the focus determination component obtains, via the device processor, the first listener focus indication from the first participant entity based on one or more of:
 an audio input associated with a name associated with the first originating entity,
 a selection indication indicating a selection of the first originating entity,
 a direction of focus associated with a positional focus of a first body part associated with the first participant entity,
 a direction of focus associated with a positional orientation of a second body part associated with the first participant entity,
 a direction of focus associated with a movement of a third body part associated with the first participant entity, or
 a direction of focus associated with a positional focus of a user device associated with the first participant entity.

8. The system of claim 7, wherein:

the selection indication indicating a selection of the first originating entity includes one or more of:
 a touch input indicating selection of an icon displayed on a touchscreen display,
 an audio selection based on an audio menu, or
 a selection indication based on a selection activation on a displayed menu.

9. The system of claim 1, further comprising:

a group determination component that determines the plurality of originating sources; and a group position determination component that determines spatial positions associated with each one of the plurality of originating sources.

10. The system of claim 9, further comprising:

a virtual participant determination component that determines one or more virtual participants included in the plurality of originating sources, wherein the group position determination component determines spatial positions associated with the one or more virtual participants.

11. The system of claim 9, further comprising:

a group position transmission component that initiates a transmission of an indication of one or more of the spatial positions associated with each one of the plurality of originating sources.

12. The system of claim 1, wherein:

the audio source determination component determines the first originating entity associated with the first one of the plurality of originating sources based on one or more of:
 determining a geographic position of the first one of the plurality of originating sources,
 determining an account associated with a device client that is associated with the first one of the plurality of originating sources,
 determining an identification of the first one of the plurality of originating sources based on a voice recognition operation,
 determining an identification of the first one of the plurality of originating sources based on a haptic input recognition operation,
 receiving an indication of an identification of the first one of the plurality of originating sources from one or more of the plurality of originating sources, or receiving an indication of an identification of the first one of the plurality of originating sources from the first participant entity.

13. The system of claim 1, wherein:
the audio data acquisition component obtains the first set of audio data that includes a mixture of conversational audio data associated with a plurality of originating sources, the first set of audio data directed to at least the first participant entity.

14. The system of claim 13, wherein:
the audio enhancement component initiates the first filtering operation on the mixture of conversational audio data to enhance a first conversation that is associated with the first originating entity, the first conversation enhanced relative to another portion of the conversational audio data that is associated with the plurality of originating sources other than the first one of the plurality of originating sources.

15. The system of claim 1, wherein:
the spatialization component initiates the spatialization of the stream of the first portion, based on one or more head related transfer functions.

16. The system of claim 1, wherein:
the spatialization component initiates the spatialization of the stream of the first portion, based on generating a binaural audio stream associated with the first portion.

17. A method comprising:
obtaining, from a first participant entity, a first participant focus indication indicating a first focus of the first participant entity on a second participant entity;
obtaining, via a device processor, a first portion of a set of audio data associated with the first participant entity as a first originating source, the first portion directed to the second participant entity, based on the first participant focus indication;
determining a spatial positional relationship between the first participant entity and the second participant entity;
obtaining, via the device processor, a second portion of the set of audio data associated with a third participant entity as a second originating source, the second portion directed to the second participant entity;
initiating a first filtering operation on the set of audio data to enhance the first portion, the first portion enhanced relative to another portion of the set of audio data that is associated with one or more originating sources other than the first originating source, the another portion including the second portion;
initiating a spatialization of the first portion that is based on a second participant positional listening perspective, based on the spatial positional relationship between the first participant entity and the second participant entity; and
initiating transmission of a first spatial stream of audio data to the second participant entity, based on the first filtering operation and the spatialization.

18. The method of claim 17, wherein determining the spatial positional relationship includes:
determining the spatial positional relationship between the first participant entity and the second participant entity based on a current distance and a direction relative to a current position associated with the first participant entity.

19. A method comprising:
obtaining, from a first participant entity, a first participant focus indication indicating a first focus of the first participant entity on a second participant entity;
obtaining, via a device processor, a first portion of a set of audio data associated with the first participant entity as a first originating source, the first portion directed to the second participant entity, based on the first participant focus indication;
determining a first spatial positional relationship between the first participant entity and the second participant entity;
obtaining, from the first participant entity, a second participant focus indication indicating a second focus of the first participant entity on a third participant entity;
obtaining, via the device processor, a second portion of the set of audio data associated with the first participant entity as the first originating source, the second portion directed to the third participant entity;
initiating a first filtering operation on the set of audio data to enhance the first portion, the first portion enhanced relative to a first other portion of the set of audio data that is associated with originating sources including at least one originating source other than the first originating source, the first other portion including the second portion;
initiating a first spatialization of the first portion that is based on a second participant positional listening perspective, based on the spatial positional relationship between the first participant entity and the second participant entity;
initiating transmission of a first spatial stream of audio data to the second participant entity, based on the first filtering operation and the spatialization;
initiating a second filtering operation on the set of audio data to enhance the second portion, the second portion enhanced relative to a second other portion of the set of audio data that is associated with originating sources including at least one originating source other than the first originating source, the second other portion including the first portion;
initiating a second spatialization of the second portion that is based on a third participant positional listening perspective, based on the spatial positional relationship between the first participant entity and the third participant entity; and
initiating transmission of a second spatial stream of audio data to the third participant entity, based on the second filtering operation and the second spatialization.

20. The method of claim 19, wherein:
obtaining, from the first participant entity, the first participant focus indication indicating the first focus of the first participant entity on the second participant entity includes one or more of:
receiving an audio input associated with a name associated with the second participant entity,
determining a selection indication indicating a selection of the second participant entity,
determining a direction of focus associated with a positional focus of a first body part associated with the first participant entity,
determining a direction of focus associated with a positional orientation of a second body part associated with the first participant entity,
determining a direction of focus associated with a movement of a third body part associated with the first participant entity, or
determining a direction of focus associated with a positional focus of a user device associated with the first participant entity.

* * * * *